US012684260B2

(12) United States Patent
Honda et al.

(10) Patent No.: US 12,684,260 B2
(45) Date of Patent: Jul. 14, 2026

(54) INFORMATION PROCESSING DEVICE AND INFORMATION PROCESSING METHOD

(71) Applicant: CANON KABUSHIKI KAISHA, Tokyo (JP)

(72) Inventors: Koki Honda, Kanagawa (JP); Yasuo Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 18/951,249

(22) Filed: Nov. 18, 2024

(65) Prior Publication Data

US 2025/0175717 A1 May 29, 2025

(30) Foreign Application Priority Data

Nov. 24, 2023 (JP) ................................. 2023-199221

(51) Int. Cl.
H04N 25/672 (2023.01)
H04N 25/47 (2023.01)

(52) U.S. Cl.
CPC ........... H04N 25/672 (2023.01); H04N 25/47 (2023.01)

(58) Field of Classification Search
CPC ..... H04N 25/47; H04N 25/672; H04N 25/683
USPC ....................................................... 348/246
See application file for complete search history.

(56) References Cited

U.S. PATENT DOCUMENTS

| 8,253,828 B2 * | 8/2012 | Nishiwaki | ............ H04N 23/843 |
| | | | 348/222.1 |
| 9,549,157 B2 * | 1/2017 | Shinozaki | ................ G02B 5/20 |
| 9,569,706 B2 * | 2/2017 | Kodama | ............... H04N 1/4051 |
| 9,582,853 B1 * | 2/2017 | Oh | ......................... G06T 3/4015 |
| 9,633,280 B2 * | 4/2017 | Takahama | ............ G06V 10/751 |
| 9,754,375 B2 * | 9/2017 | Koshiba | .................... H04N 1/58 |
| 10,701,328 B2 * | 6/2020 | Yamada | ............... G06T 7/0002 |
| 11,199,637 B2 * | 12/2021 | Kobayashi | ............. H04N 25/68 |
| 2010/0026862 A1 * | 2/2010 | Nishiwaki | ............ H04N 25/683 |
| | | | 348/246 |
| 2015/0156484 A1 * | 6/2015 | Takahama | ............... G06T 7/593 |
| | | | 348/187 |
| 2015/0288935 A1 | 10/2015 | Shinozaki | |
| 2016/0148385 A1 | 5/2016 | Koshiba | |

(Continued)

FOREIGN PATENT DOCUMENTS

| JP | 2004015191 A | 1/2004 |
| JP | 2005223796 A | 8/2005 |
| JP | 2005236749 A | 9/2005 |

*Primary Examiner* — Pritham D Prabhakher
(74) *Attorney, Agent, or Firm* — Canon U.S.A., Inc. IP Division

(57) ABSTRACT

A processing device including a first connecting unit determining that, when a difference between pixel values of two adjacent pixels is within a first range, the two adjacent pixels belong to the same first connected pixel group, a pixel value determination unit determining that a first condition is satisfied when, in a neighboring pixel group including a target pixel and a neighboring pixel, a rank of a pixel value of the target pixel is out of a second range, a first connection number determination unit determining that a second condition is satisfied when the number of pixels belonging to the first connected pixel group is equal to or less than a first threshold value, and a correction unit correcting the pixel value of the target pixel when the first and the second conditions are satisfied and not correcting it when the first or second condition is not satisfied.

19 Claims, 26 Drawing Sheets

(56) References Cited

U.S. PATENT DOCUMENTS

| | | | |
|---|---|---|---|
| 2017/0039682 A1* | 2/2017 | Oh | G06T 7/90 |
| 2019/0191136 A1* | 6/2019 | Yamada | G06T 5/70 |
| 2020/0166656 A1 | 5/2020 | Kobayashi | |
| 2020/0336684 A1* | 10/2020 | Wang | H04N 23/843 |
| 2020/0351456 A1* | 11/2020 | Suzuki | G06T 5/70 |
| 2025/0148579 A1* | 5/2025 | Yamamoto | G06T 5/73 |

* cited by examiner

FIG. 24A
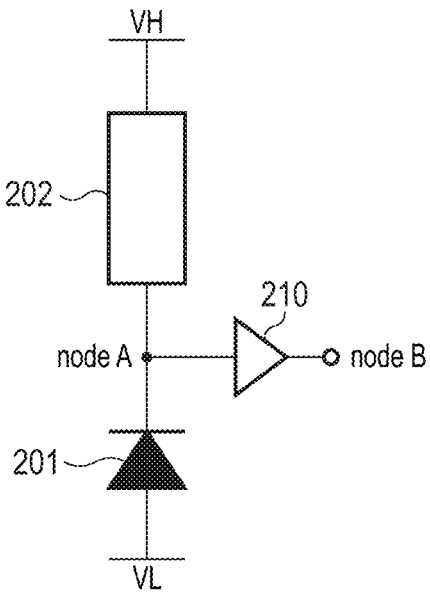
FIG. 24B
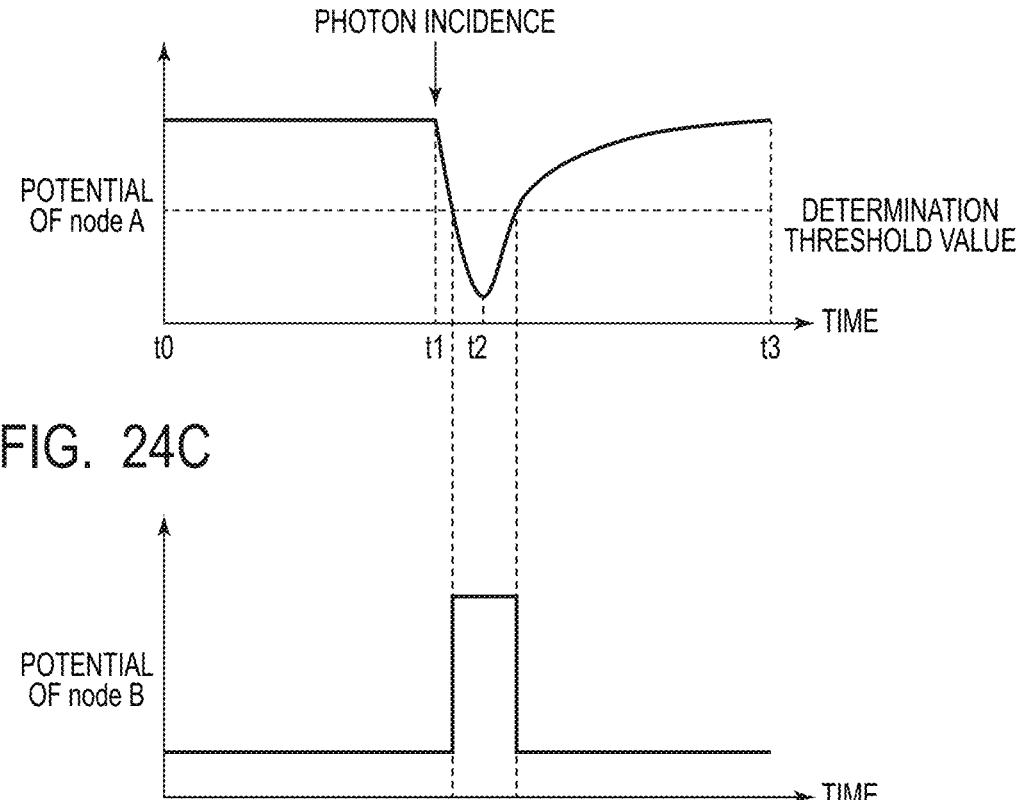
FIG. 24C

INFORMATION PROCESSING DEVICE AND INFORMATION PROCESSING METHOD

BACKGROUND

Technical Field

The aspect of the embodiments relates to an information processing device and an information processing method.

Description of the Related Art

Some imaging devices such as digital cameras have a plurality of imaging elements that photoelectrically convert incident light into electrical signals. In an imaging device including a plurality of imaging elements, output characteristics of signals of a part of the plurality of imaging elements may be different from those of other imaging elements, and a part of the plurality of imaging elements may output abnormally high signals or low signals.

If such an abnormal signal output from the imaging element is used as it is without correction, the image quality may deteriorate due to the abnormal pixel. Therefore, in Japanese Patent Application Laid-Open No. 2005-236749, Japanese Patent Application Laid-Open No. 2004-015191, and Japanese Patent Application Laid-Open No. 2005-223796, methods of detecting and correcting an abnormal pixel are proposed.

Since occurrence ratio and distribution of abnormal pixels are various, a method of dynamically correcting abnormal pixels in consideration of various occurrence modes is required.

SUMMARY

According to an aspect of the embodiments, there is provided a processing device including a first connecting unit configured to determine that, when a difference between pixel values of two adjacent pixels in a plurality of pixels arranged to form a plurality of rows and a plurality of columns is within a first range, the two adjacent pixels belong to the same first connected pixel group, a pixel value determination unit configured to determine that a first condition is satisfied when, in a neighboring pixel group including a target pixel and a neighboring pixel arranged in a vicinity of the target pixel, a rank of a pixel value of the target pixel is higher than an upper limit of a second range or lower than a lower limit of the second range, a first connection number determination unit configured to determine that a second condition is satisfied when the number of pixels belonging to the first connected pixel group including the target pixel is equal to or less than a first threshold value, and a correction unit configured to correct the pixel value of the target pixel when at least the first condition and the second condition are satisfied and not to correct the pixel value of the target pixel when the first condition is not satisfied, or when the second condition is not satisfied.

According to another aspect of the embodiments, there is provided an information processing method including determining that, when a difference between pixel values of two adjacent pixels in a plurality of pixels arranged to form a plurality of rows and a plurality of columns is within a first range, the two adjacent pixels belong to the same first connected pixel group, determining that a first condition is satisfied when, in a neighboring pixel group including a target pixel and a neighboring pixel arranged in a vicinity of the target pixel, a rank of a pixel value of the target pixel is higher than an upper limit of a second range or lower than a lower limit of the second range; determining that a second condition is satisfied when the number of pixels belonging to the first connected pixel group including the target pixel is equal to or less than a first threshold value; and correcting the pixel value of the target pixel when at least the first condition and the second condition are satisfied. The pixel value of the target pixel is not corrected when the first condition is not satisfied, or when the second condition is not satisfied.

Further features of the disclosure will become apparent from the following description of exemplary embodiments with reference to the attached drawings.

BRIEF DESCRIPTION OF THE DRAWINGS

FIG. 1 is a block diagram illustrating a hardware configuration of an information processing device according to a first embodiment.

FIG. 20 is a schematic diagram illustrating an overall configuration of a photoelectric conversion device according to a fifth embodiment.

FIG. 22 is a schematic block diagram illustrating a configuration example of a circuit substrate according to the fifth embodiment.

FIGS. 24A, 24B, and 24C are diagrams illustrating an operation of an avalanche photodiode according to the fifth embodiment.

DESCRIPTION OF THE EMBODIMENTS

Figure 2:
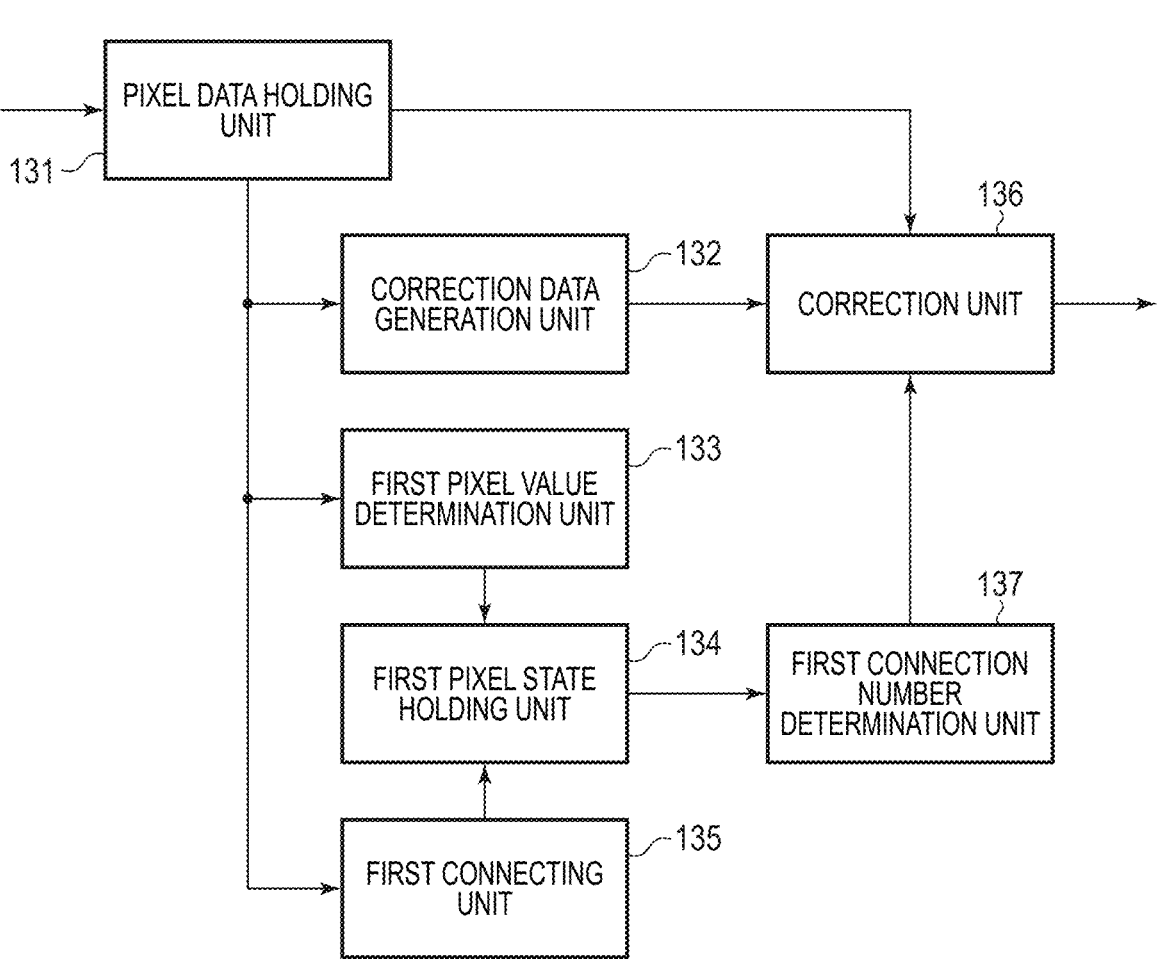
FIG. 2 is a functional block diagram related to a correction processing function of the information processing device according to the first embodiment.

Hereinafter, embodiments of the disclosure will be described with reference to the drawings. The same or corresponding elements are denoted by the same reference numerals throughout the several drawings, and the description thereof may be omitted or simplified.

First Embodiment

Figure 1:
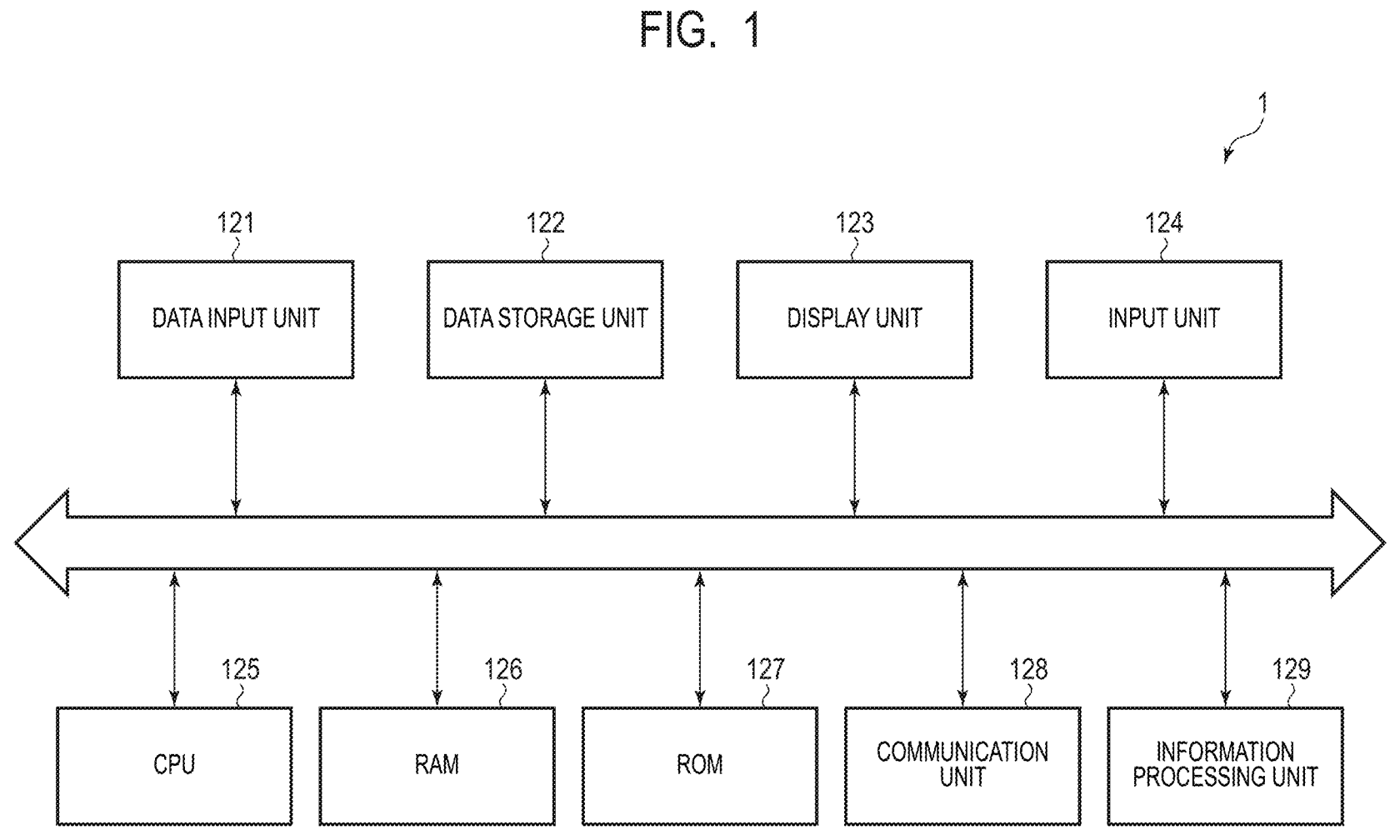

FIG. 1 is a block diagram illustrating a hardware configuration of an information processing device 1 according to the present embodiment. The information processing device 1 performs information processing such as correction on pixel data acquired by a photoelectric conversion device. FIG. 1 illustrates an example in which information processing in the information processing device 1 is performed by a general computer, but the function of the information processing in the information processing device 1 may be realized by another device. For example, the information processing device 1 may be an image processing device specialized for an image processing function, or may be an image processing unit incorporated in a photoelectric conversion device.

The information processing device 1 includes a data input unit 121, a data storage unit 122, a display unit 123, and an input unit 124. In addition, the information processing device 1 includes a central processing unit (CPU) 125, a random access memory (RAM) 126, and a read only memory (ROM) 127. In addition, the information processing device 1 includes a communication unit 128 and an information processing unit 129. These units are connected to each other via a bus. FIG. 1 illustrates an example of the configuration of the information processing device 1, and a part of the unit illustrated in FIG. 1 may be arranged in a device outside the information processing device 1, or a device other than the units illustrated in FIG. 1 may be further arranged in the information processing device 1.

The data input unit 121 includes a photoelectric conversion device such as an image sensor. The photoelectric conversion device includes a plurality of pixel circuits arranged to form a plurality of rows and a plurality of columns. Each of the plurality of pixel circuits photoelectrically converts incident light to generate an electrical signal. The electrical signal generated by each of the plurality of pixel circuits is converted into a digital signal (pixel value). In this manner, the data input unit 121 has a function of generating pixel values of pixels arranged to form a plurality of rows and a plurality of columns as image data and inputting the image data to the information processing device 1. When the photoelectric conversion device is arranged outside the information processing device, the data input unit 121 may be an interface that acquires image data from the photoelectric conversion device.

The data storage unit 122 is a storage medium that stores data used for information processing on image data, parameters, or the like. The storage medium may be, for example, a computer-readable nonvolatile storage medium such as a hard disk, a solid state drive (SSD), or a flexible disk. The storage medium may be an optical disc such as compact disc (CD)-ROM, CD-recordable (CD-R), digital versatile disc (DVD), or Blu-ray (registered trademark). The storage medium may be a semiconductor memory such as a memory card, a compact flash (CF) card, a smart medium, an SD card, a memory stick, an xD picture card, or a universal serial bus (USB) memory. The data storage unit 122 may store data other than the program and the image data. Also, a part of the storage capacity of the RAM 126 may be used as the data storage unit 122. Alternatively, an external storage device communicatively connected to the information processing device 1 by the communication unit 128 may be used as the data storage unit 122.

The display unit 123 is a device that displays an image before image processing, displays an image after image processing, or displays an operation image such as a graphical user interface. The display unit 123 may be a cathode-ray tube (CRT) display, a liquid crystal display, an organic electro-luminescence (EL) display, or the like. Alternatively, the display unit 123 may be an external display provided outside the information processing device 1 and communicatively connected by a cable or the like.

The input unit 124 is a device for the user to input instructions or data. The input unit 124 includes a keyboard, a pointing device, and the like. Examples of pointing devices include a mouse, a trackball, a track pad, a tablet, and the like. Alternatively, when the information processing device 1 of the present embodiment is applied to a device such as a digital camera or a printer, the input unit 124 may be a button, a dial, or the like. The input unit 124 may be a software keyboard displayed on a screen by software. In this case, the input unit 124 may be configured such that the user inputs characters to a software keyboard by operating buttons, dials, or pointing devices.

Note that the same device such as a touch screen device may also serve as the display unit 123 and the input unit 124. In this case, information input to the information processing device 1 by the user operating the operation screen displayed on the touch screen device is treated as input information from the input unit 124.

The input unit 124 may be configured to receive an instruction from the user through gesture recognition processing. In this case, the input unit 124 includes an input device for inputting an image captured by visible light or infrared light, and a recognition device that recognizes a gesture of the user from the image and converts the gesture into a command. The data input unit 121 may also serve as the input device. The recognition device may be added as a dedicated gesture recognition circuit, or may be realized by the CPU 125 executing a gesture recognition program.

The input unit 124 may be configured to receive an instruction from the user by voice recognition processing. In this case, the input unit 124 includes a microphone device and a recognition device that recognizes the user's utterance from audio data acquired by the microphone device and converts the utterance into a command. The recognition device may be added as a dedicated voice recognition circuit, or may be realized by the CPU 125 executing a voice recognition program.

Note that the gesture recognition processing and the voice recognition processing described above may be performed by a device external to the information processing device 1. In this case, the information processing device 1 communicates with an external device or a server on a network via the communication unit 128, and transmits image data or audio data to the external device or the server. The external device or the server is configured to receive image data or audio data in accordance with a predetermined communication procedure, perform recognition processing, and transmit data indicating a recognition result to the information processing device 1.

The CPU 125 is a processor that controls each unit of the information processing device 1 and performs information processing. The RAM 126 and the ROM 127 provide programs, data, working areas, and the like necessary for control and information processing to the CPU 125. When the program is stored in the data storage unit 122 or the ROM 127, the program is once read into the RAM 126 and then executed by the CPU 125. The information processing device 1 may be configured to receive a program from the outside via the communication unit 128. In this case, the program is once stored in the data storage unit 122 and then read into the RAM 126, or directly read into the RAM 126 from the communication unit 128 and then executed by the CPU 125.

Although FIG. 1 illustrates only one block indicating the CPU 125, the number of CPUs 125 is not limited to one. That is, the information processing device 1 may include a plurality of CPUs 125.

The communication unit 128 is an interface for performing communication between devices. The communication unit 128 may be based on a wired communication system such as a wired network, RS-232C, USB, IEEE 1284, IEEE 1394, or a telephone line. Alternatively, the communication unit 128 may be based on a wireless communication system such as infrared (IrDA), IEEE802.11a, IEEE802.11b, IEEE802.11g, IEEE802.11n, IEEE802.11ac, IEEE 802.11ax. Alternatively, the communication unit 128 may be based on another wireless communication system such as Bluetooth (registered trademark), an ultra wide band (UWB), a wireless telephone line, or a near field communication (NFC). Alternatively, the communication unit 128 may be based on an inter-chip communication system such as an inter-integrated circuit (I2C) or a serial peripheral interface (SPI).

The number of communication methods supported by the communication unit 128 is not limited to one, and a plurality of communication systems may be supported. For example, the communication unit 128 may be configured to support two or more of the various communication systems described above. Alternatively, the information processing device 1 may include a plurality of communication units 128 that support different communication systems. Also in this case, the plurality of communication units 128 will be collectively referred to as communication units 128 in the present embodiment.

The information processing unit 129 is a signal processing circuit including a digital signal processor (DSP), a logic circuit, and the like. Alternatively, the information processing unit 129 may be a graphics processing unit (GPU). The information processing unit 129 performs arithmetic processing on image data input from the data input unit 121 or image data held in the RAM 126, the data storage unit 122, or the like. The processing result in the information processing unit 129 may be output to the RAM 126, the data storage unit 122, the display unit 123, or the like, or may be output to an external device of the information processing device 1 via the communication unit 128. When the load of the arithmetic processing is small such as a case where a high calculation speed is not required or a case where the amount of data to be calculated is small, the CPU 125 may also serve as the information processing unit 129.

Although not illustrated in FIG. 1, a register circuit may be added, as necessary. The register circuit holds operation parameters of the CPU 125 or the information processing unit 129. The value held in the register circuit may be set by the CPU 125 or the information processing unit 129, or may be set by an external device via the communication unit 128.

When the information processing device 1 is a camera device, the display unit 123 may have a function of displaying a preview image of an object and a function of displaying a photographed image. However, these images may be displayed on another device (for example, a smartphone) connected via the communication unit 128. In that case, the display unit 123 may be omitted. Similarly, another device connected via the communication unit 128 may receive an instruction from the user, and the information processing device 1 may receive a command corresponding to the instruction via the communication unit 128, so that the information processing device 1 may perform an operation according to the command. In this case, the CPU 125 or the information processing unit 129 may perform processing of specifying corresponding operation from the command.

Alternatively, when processing and control by software are unnecessary, the CPU 125, the ROM 127, and the like may be omitted. As an example of such a case, there is a case where a logic circuit that realizes necessary processing and control is arranged in the information processing unit 129.

Alternatively, the information processing device 1 may be a stacked sensor in which a substrate in which a photoelectric conversion element is arranged and a substrate in which a signal processing circuit is arranged are stacked. In this case, a logic circuit, a memory, the CPU 125, and the like may be arranged inside the stacked sensor. In such a configuration, the data input unit 121 may include a photoelectric conversion element and peripheral circuits thereof. In addition, the data storage unit 122, the CPU 125, the RAM 126, the ROM 127, the communication unit 128, and the information processing unit 129 may be arranged inside the stacked sensor. In this case, the display unit 123 and the input unit 124 may be omitted.

FIG. 2 is a functional block diagram related to a correction processing function of the information processing device 1 according to the present embodiment. The information processing device 1 includes a pixel data holding unit 131, a correction data generation unit 132, a first pixel value determination unit 133, a first pixel state holding unit 134, a first connecting unit 135, a correction unit 136, and a first connection number determination unit 137.

Functions of the pixel data holding unit 131 and the first pixel state holding unit 134 are realized by, for example, the data storage unit 122 in FIG. 1. Functions of the correction data generation unit 132, the first pixel value determination unit 133, the first connecting unit 135, the correction unit 136, and the first connection number determination unit 137 are realized by, for example, the information processing unit 129 in FIG. 1. The functions of the correction data generation unit 132, the first pixel value determination unit 133, the first connecting unit 135, the correction unit 136, and the first connection number determination unit 137 may be realized by the CPU 125 executing a correction processing program. The correction processing program may be stored in advance in the data storage unit 122 or the ROM 127, or may be acquired from another device via the communication unit 128. An operation of each of these units will be described later.

Hereinafter, correction processing executed by the information processing device 1 according to the present embodiment will be described with reference to FIGS. 3 to 8B. First, the configuration of pixel data acquired by the photoelectric conversion device and held in the pixel data holding unit 131 will be described before describing a specific processing procedure.

Figure 3:
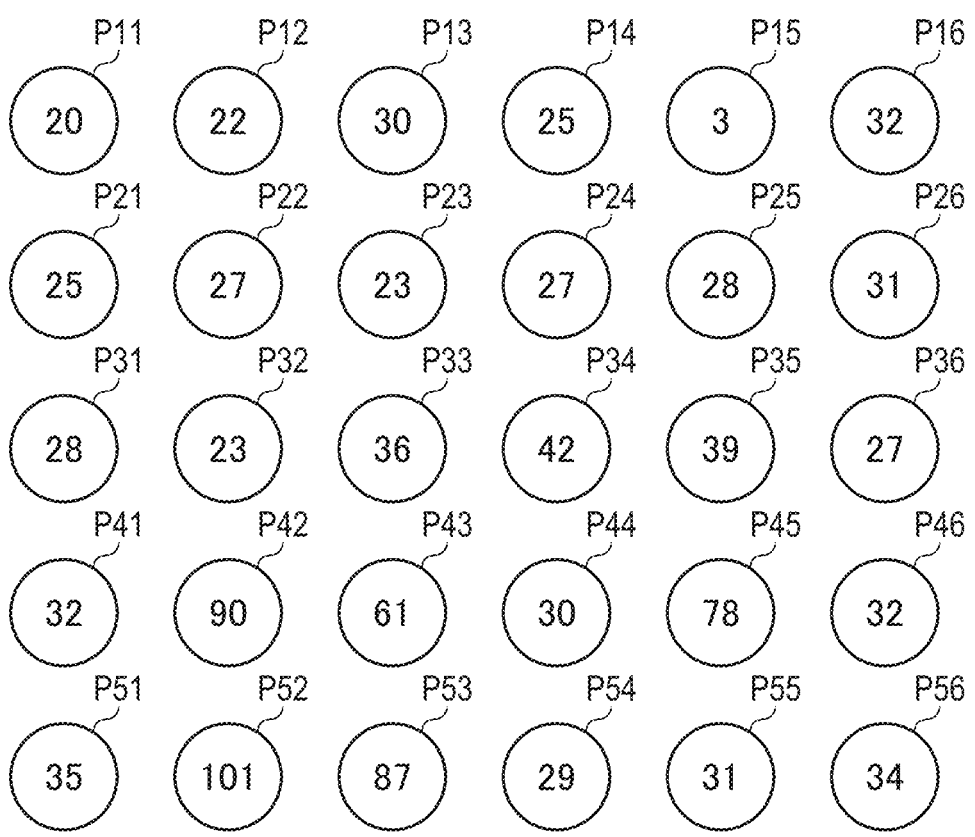
FIG. 3 is a diagram schematically illustrating an arrangement of pixels according to the first embodiment.

FIG. 3 is a diagram schematically illustrating an arrangement of pixels according to the present embodiment. FIG. 3 schematically illustrates a plurality of pixels P11 to P56 constituting image data held in the pixel data holding unit 131 and pixel values of the pixels. The plurality of pixels P11 to P56 are arranged to form a plurality of rows and a plurality of columns. For simplicity of description, only five rows and six columns of pixels are illustrated in FIG. 3, but more pixels may be arranged in practice.

In the reference numerals assigned to the pixels, two numerical values after "P" indicate a row number and a column number, respectively. In FIG. 3, values described in circles indicating the pixels P11 to P56 indicate pixel values. For example, "20" is indicated in the circle of the pixel P11, which indicates that the pixel value of the pixel P11 is 20.

In the description of the present embodiment, the pixel array will be described on the assumption that the image to be processed is a grayscale image for simplicity, but the image to be processed may be a color image. For example, when the pixel array is an array for each color channel of red, green, and blue, the correction processing of the present embodiment can be similarly applied by independently performing the processing for each color channel. In addition, even in a case where the pixel array is a Bayer arrangement, the correction processing of the present embodiment can be similarly applied by independently performing the processing for each color channel.

An abnormal pixel to be corrected in the present embodiment will be described. The abnormal pixel means a pixel having a peculiar pixel value compared to a pixel in the vicinity of the pixel. The abnormal pixel may include so-called a white flaw and a black flaw. The white flaw is an abnormal pixel having a pixel value significantly greater than that of a neighboring pixel, and the black flaw is an abnormal pixel having a pixel value significantly less than that of a neighboring pixel.

However, a pixel having a peculiar pixel value is not necessarily one independent pixel. That is, since two or more abnormal pixels may be connected, it is necessary to consider the connected abnormal pixels in correcting the abnormal pixels. Here, "two abnormal pixels are connected" means that the two abnormal pixels are in a positional relationship continuous in one of the vertical direction, the horizontal direction, and the oblique direction in FIG. 3.

The following expression (1) indicates a probability that at least one of eight pixels in the vicinity of a certain abnormal pixel is an abnormal pixel.

$$1 - (1 - P)^8 \tag{1}$$

Here, P is a ratio of abnormal pixels among all pixels, and is a number of zero or more and one or less.

In this case, the expected value of the number of occurrences of the connected abnormal pixels is generally expressed by the following expression (2).

$$H \times W \times P \times \{1 - (1 - P)^8\} \tag{2}$$

Here, H is the number of rows of pixels, and W is the number of columns of pixels.

For example, in an image in which the number of columns of pixels is 4096 and the number of rows of pixels is 2048, even if the ratio P is a very small value of 0.1%, the expected value of the number of abnormal pixels calculated by the expression (2) is about 67. Assuming that all of these abnormal pixels are pairs of two abnormal pixels and three or more abnormal pixels are not connected, there are about 33 pairs of connected abnormal pixels in the image. This corresponds to a state in which, when an image is divided into 32 pieces of 8×4, approximately one pair of continuous abnormal pixels exists in each divided image. That is, the occurrence probability of an event that the abnormal pixels are adjacent to each other cannot be ignored.

Further, a probability that two or more abnormal pixels are present in eight pixels in the vicinity of a certain abnormal pixel, that is, a probability that three or more abnormal pixels are connected to each other will be described. The expression (1) indicates the probability that one or more abnormal pixels are present in eight pixels in the vicinity of a certain abnormal pixel. Therefore, by subtracting a probability that only one abnormal pixel exists in the eight pixels in the vicinity of a certain abnormal pixel from the expression (1), the probability that two or more abnormal pixels exist in the eight pixels in the vicinity of a certain abnormal pixel can be calculated.

The probability that only one abnormal pixel exists in eight pixels in the vicinity of a certain abnormal pixel is expressed by the following expression (3).

$$\binom{8}{1} P^1 (1 - P)^7 \tag{3}$$

Therefore, an expected value of the number of occurrences of three or more connected abnormal pixels is generally expressed by the following expression (4).

$$H \times W \times P \times \left[ \{1 - (1 - P)^8\} - \binom{8}{1} P^1 (1 - P)^7 \right] \tag{4}$$

As an example, in an image in which the number of columns of pixels is 4096 and the number of rows of pixels is 2048, an expected value of the number of three or more connected abnormal pixels is calculated. In the case of P=0.1%, the expected value of the number of three or more connected abnormal pixels is 0.234. In the case of P=0.5%, the expected value of the number of three or more connected abnormal pixels is 28.8. In the case of P=1.0%, the expected value of the number of three or more connected abnormal pixels is 226.

As described above, even if the ratio P is a small value of 1% or less, the possibility that three or more connected abnormal pixels exist cannot be ignored. Furthermore, depending on the values of P, H, and W, it may be necessary to consider four or more connected abnormal pixels. As described above, in consideration of the case where a plurality of abnormal pixels are connected, the information processing device 1 according to the present embodiment performs correction processing on N or less connected abnormal pixels (N is a positive integer).

Figure 4:
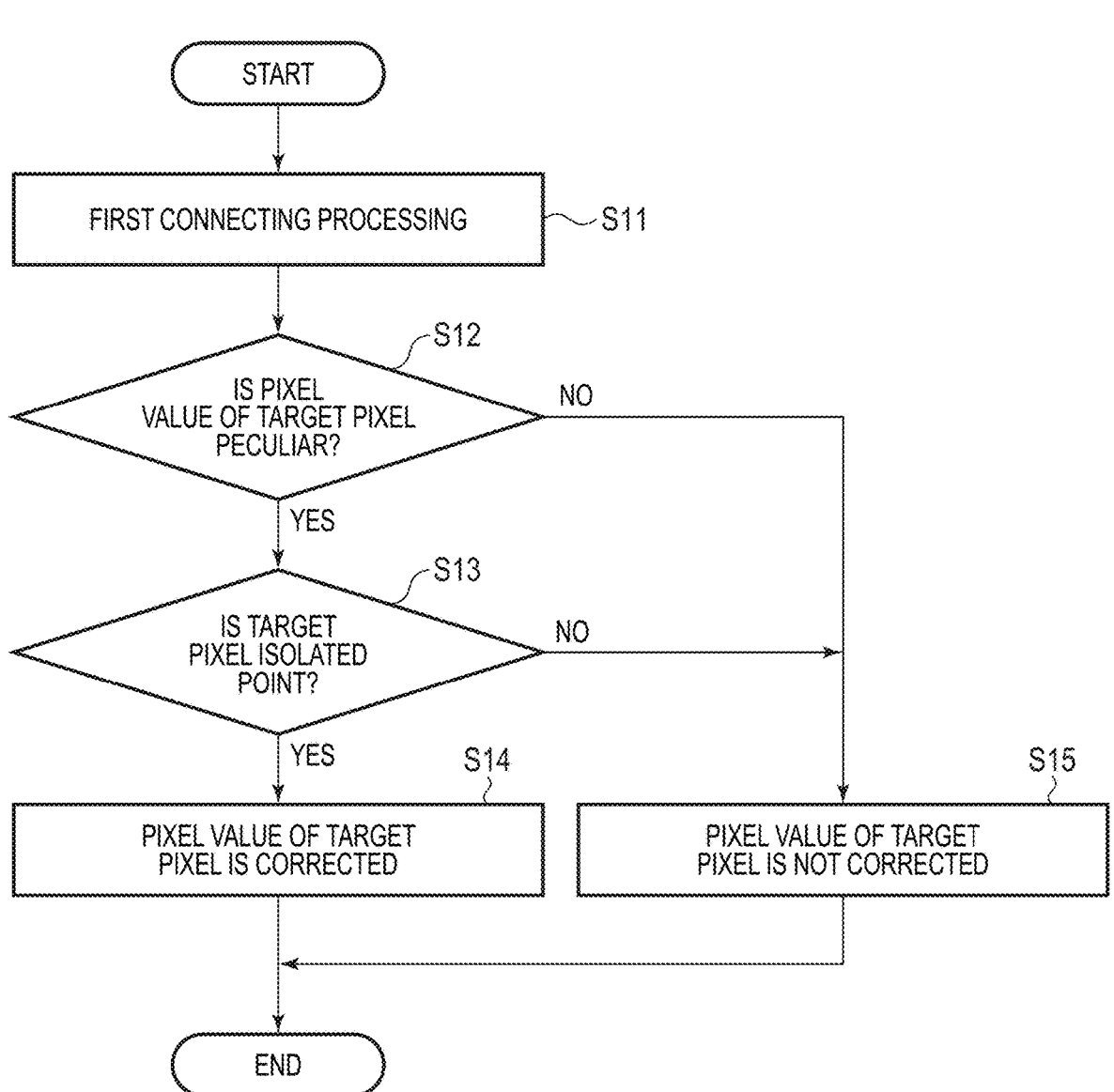
FIG. 4 is a flowchart illustrating correction processing executed by the information processing device according to the first embodiment.

FIG. 4 is a flowchart illustrating correction processing executed by the information processing device 1 according to the present embodiment. The correction processing method of the present embodiment will be described with reference to the flowchart of FIG. 4.

The processing of FIG. 4 includes detecting an abnormal pixel from an image captured by the photoelectric conversion device and correcting the detected abnormal pixel. The processing of FIG. 4 is started, for example, after the photoelectric conversion device performs image capturing and an image is held in the pixel data holding unit 131. Note that, in the processing of the present embodiment, position information (so-called flaw map) of the abnormal pixels acquired in advance and the image (so-called dark image) captured in the light-shielded state are not used. In addition, it is assumed that the pixel data holding unit 131 has a storage capacity capable of simultaneously holding pixel values of a plurality of pixels of the entire image of one frame. Similarly, the first pixel state holding unit 134 has a storage capacity capable of simultaneously holding pixel states of the entire image of one frame.

In step S11, the first connecting unit 135 acquires the pixel values of the plurality of pixels constituting the image from the pixel data holding unit 131. Then, when the pixel values of the two adjacent pixels are close to each other (a difference between pixel values of two adjacent pixels is within a first range), the first connecting unit 135 determines that the two pixels belong to the same first connected pixel group (first connecting processing). The first pixel state holding unit 134 holds information indicating the determination result of the first connecting processing. In this processing, for each pixel, pixel values of a pixel region of three rows and three columns including a pixel to be processed (target pixel) and eight pixels in the vicinity of the pixel to be processed are referred to, and comparison of the pixel values and determination are performed. The determination result is held in a data area corresponding to the referenced pixel region of three rows and three columns in the first pixel state holding unit 134.

Hereinafter, processing in which the first connecting unit 135 determines that two pixels belong to the same first connected pixel group and the first pixel state holding unit 134 holds the pixel states of these pixels may be referred to as "connecting". Among the plurality of pixels after the connecting processing is completed, a pixel whose connection number is equal to or less than N (N is a positive integer) is referred to as an isolated point. Here, the connection number is the number of pixels that can be reached by following a pixel connected from a certain pixel, that is, the number of pixels belonging to the same first connected pixel group. For example, when a certain pixel is not connected to any pixel, the connection number is one. The value of N indicates the upper limit number of the connection of abnormal pixels to be considered, and can be appropriately set according to the required accuracy of abnormal pixel detection, image quality, and the like.

First, an example of the first connecting processing in a case where the value of the threshold value N of the connection number in the determination of an isolated point is one, that is, in a case where a pixel that is not connected with another pixel is set as an isolated point will be described with reference to FIGS. 5A to 7D.

Figure 5A:
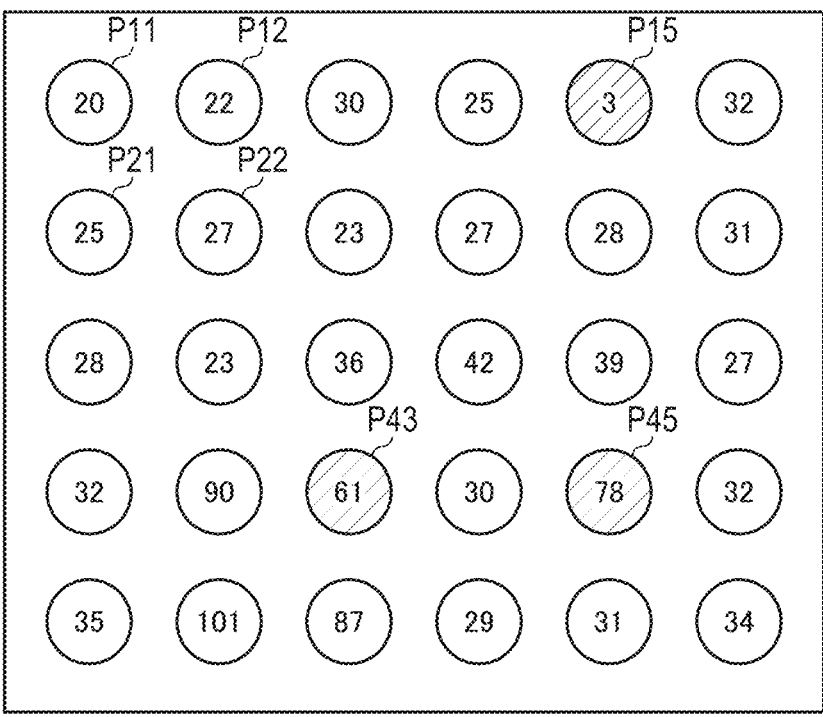
FIG. 5A is a diagram schematically illustrating an example of pixel values and FIG. 5B is a diagram schematically illustrating an example of pixel states in the correction processing according to the first embodiment.
Figure 5B:
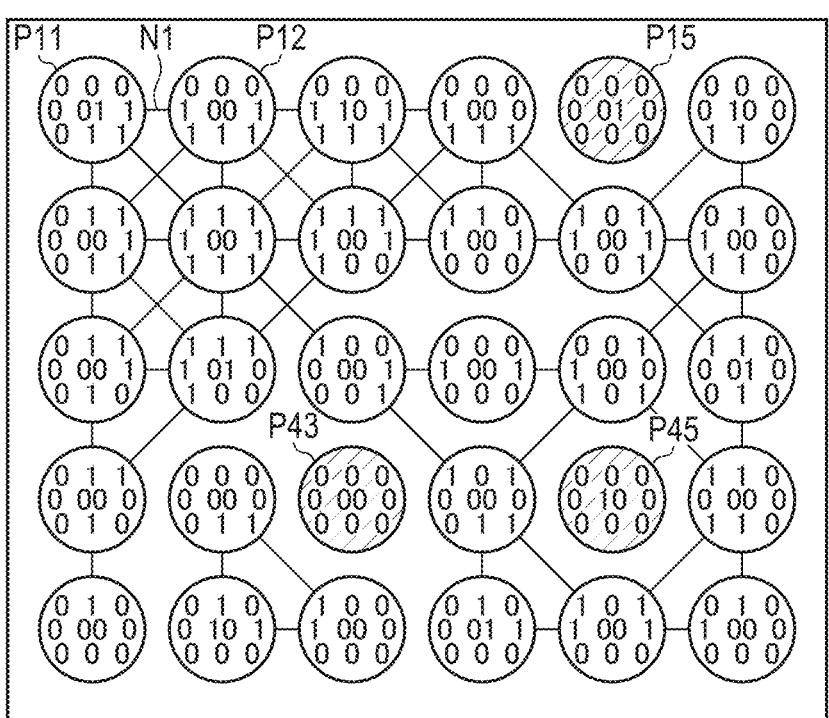

FIG. 5A is a diagram schematically illustrating an example of pixel values in the correction processing according to the present embodiment. The notation in FIG. 5A is the same as in FIG. 3. FIG. 5B is a diagram schematically illustrating an example of pixel states in the correction processing according to the present embodiment. FIG. 5B schematically illustrates pixel state data held in the first pixel state holding unit 134 corresponding to each pixel. A connection line N1 indicates a relationship between two adjacent pixels P11 and P12, and indicates that the pixel value "20" of the pixel P11 and the pixel value "22" of the pixel P12 are determined to be close to each other and are connected to each other.

In FIG. 5B, numerical values described at eight outer positions in a circle corresponding to each pixel are connection data indicating whether a pixel value of the pixel is close to a pixel value of an adjacent pixel. In the connection data, "0" indicates that the pixel value of the pixel and the pixel value of the adjacent pixel in the corresponding direction are not close to each other and are not connected. In addition, "1" indicates that the pixel value of the pixel and the pixel value of the adjacent pixel in the corresponding direction are close to each other and are connected to each other. In addition, the number of adjacent pixels is less than eight for the pixels at an end portion. As described above, when there is no adjacent pixel, the value of the connection data is zero.

Figure 6A:
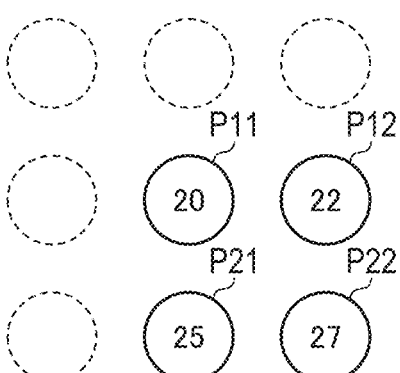
FIG. 6A is a diagram schematically illustrating an example of pixel values.
Figure 6B:
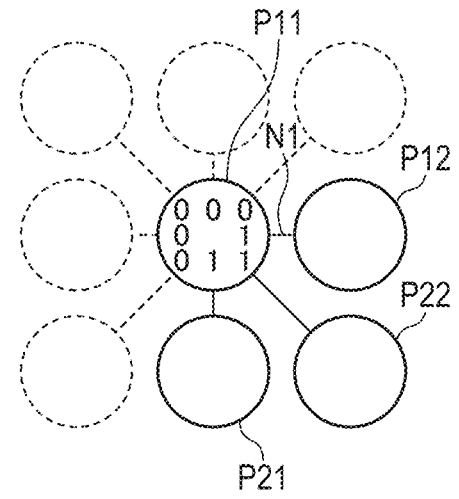
FIG. 6B is a diagram schematically illustrating an example of pixel states.

FIG. 6A is a diagram schematically illustrating an example of pixel values in the vicinity of the pixel P11. FIG. 6B is a diagram schematically illustrating an example of a pixel state in the vicinity of the pixel P11. As illustrated in FIG. 6B, among the connection data of the pixel P11, the right side, the lower side, and the lower right side are one, and the pixel P11 is connected to adjacent pixels by connection lines N1. Specifically, since the pixel P11 has a pixel value close to any of the pixels P12, P21, and P22, the pixel P11 is connected to each of the pixels P12, P21, and P22. Since the pixel P11 is a pixel arranged at an end portion and there is no adjacent pixel in directions other than the directions to the right side, the lower side, and the lower right side, the connection data of the pixel P11 except for the right side, the lower side, and the lower right side is zero.

Figure 6C:
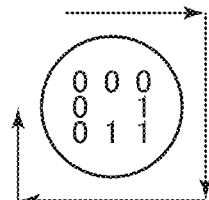
FIGS. 6C and 6D are diagrams schematically illustrating an example of a data holding method in the correction processing according to the first embodiment.
Figure 6D:
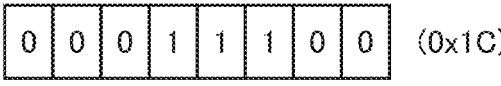

FIG. 6C and FIG. 6D are diagrams schematically illustrating a method of holding the connection data. For example, as illustrated in FIG. 6C, the eight values included in the connection data can be held as 8-bit data by arranging them in a line in a clockwise order with reference to a value in a certain direction. FIG. 6D illustrates 8-bit data "00011100" ("1C" in hexadecimal representation) obtained in this way.

In FIGS. 5A and 5B, all the eight values included in the connection data of the hatched pixels P15, P43, and P45 are zero. As described above, the pixels P15, P43, and P45 whose eight values are all zero are not connected to other pixels. Since the connection number of the pixels is one, that is, the connection number is equal to or less than N, the pixels P15, P43, and P45 are isolated points.

FIGS. 7A to 7D are graphs illustrating examples of threshold values used in the first connecting unit 135 to determine whether the pixel values of two adjacent pixels are close. In the comparison of the magnitude relationship using the threshold value described below, "equal to or greater than" and "greater than" can be interchanged, and "equal to or less than" and "less than" can also be interchanged.

In FIGS. 7A to 7D, the horizontal axis indicates the pixel value of the target pixel, and the vertical axis indicates the pixel value of a neighboring pixel adjacent to the target pixel. In FIGS. 7A to 7D, a straight line L1 has a slope of one and an intercept of zero (that is, y=x), and indicates a lower limit threshold value of a pixel value of a neighboring pixel to be connected.

Figure 7A:
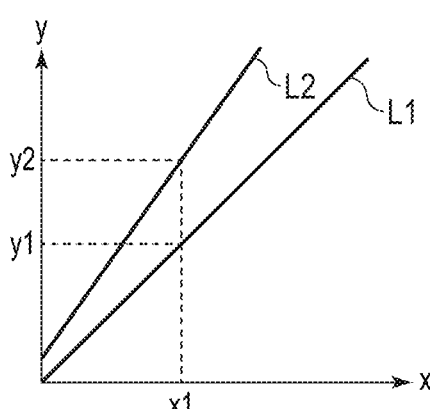
FIGS. 7A, 7B, 7C, and 7D are graphs illustrating examples of threshold values in the correction processing according to the first embodiment.

In FIG. 7A, a straight line L2 indicates an upper limit threshold value of a pixel value of a neighboring pixel to be connected. The slope of the straight line L2 is greater than one, and the intercept of the straight line L2 is greater than zero. On the straight line L2, when x=x1, y=y2. When the pixel value of the target pixel is x1, and when the pixel value of the neighboring pixel is equal to or greater than y1 (=x1) and equal to or less than y2, the target pixel and the neighboring pixel are connected to each other. That is, the first connecting unit 135 connects two pixels when the pixel value of the target pixel and the pixel value of the neighboring pixel are in a region sandwiched between the straight line L1 and the straight line L2 (The difference between the pixel value of the target pixel and the pixel value of the neighboring pixel is within a first range determined by the upper limit threshold value and the lower limit threshold value.). In this case, the first pixel state holding unit 134 holds "1" as the value of the corresponding bit of the connection data of the target pixel and the neighboring pixels, thereby holding the pixel state indicating the connection state. That is, "1" is held in each of a bit indicating the direction of the neighboring pixel of the connection data corresponding to the target pixel and a bit indicating the direction of the target pixel of the connection data corresponding to the neighboring pixel.

Figure 7B:
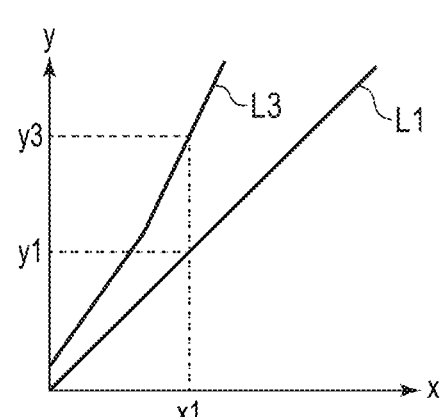

Functions for determining the threshold values are not limited to those illustrated in FIG. 7A. For example, as illustrated in FIG. 7B, the upper limit threshold value may be given by a polygonal line L3 constituted by a plurality of line segments. On the line L3, when x=x1, y=y3. When the pixel value of the target pixel is x1, and when the pixel value of the neighboring pixel is equal to or greater than y1 (=x1) and equal to or less than y3, the target pixel and the neighboring pixel are connected to each other.

Figure 7C:
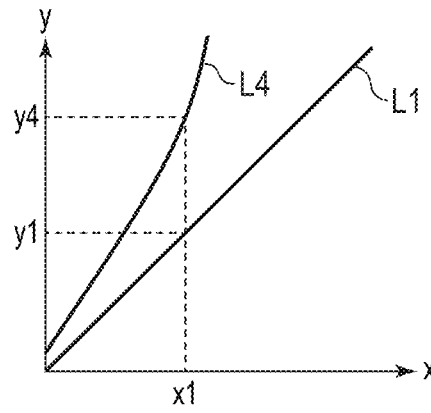

Alternatively, for example, the upper limit threshold value may be given by a curve L4 as illustrated in FIG. 7C. On the line L4, when x=x1, y=y4. When the pixel value of the target pixel is x1, and when the pixel value of the neighboring pixel is equal to or greater than y1 (=x1) and equal to or less than y4, the target pixel and the neighboring pixel are connected to each other.

Figure 7D:
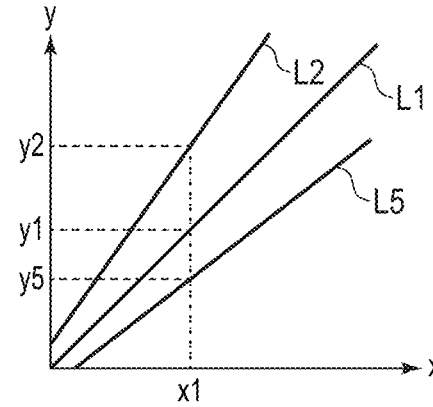

Further, for example, as illustrated in FIG. 7D, the lower limit threshold value may be given by a straight line L5 different from the straight line L1. The slope of the straight line L5 is less than one, and the intercept of the straight line L5 is less than zero. On the straight line L5, when x=x1, y=y5. When the pixel value of the target pixel is x1, and when the pixel value of the neighboring pixel is equal to or greater than y5 (<x1) and equal to or less than y2, the target pixel and the neighboring pixel are connected to each other.

In the example of FIG. 7D, one or both of the straight line L2 and the straight line L5 may be replaced by a polygonal line or a curve. The straight line L2 and the straight line L5 may be replaced by different types of lines.

A method of acquiring the threshold value (upper limit threshold value or lower limit threshold value) will be described. When the graph shape of the threshold value is simple, the first connecting unit 135 may calculate the threshold value by a function in which the pixel value of the target pixel is input and the value of the threshold value is output. In this case, the coefficients of the terms included in the function as parameters is used so that the function can be adjusted. Further, it is not essential that the expression of this function is the same over the entire area of the graph, and for example, this function may be a piecewise linear function. In addition, the first connecting unit 135 may include a lookup table in which the pixel value of the target pixel and the threshold value are associated with each other. In this case, the first connecting unit 135 acquires the threshold value by referring to the pixel value of the target pixel as an index. Here, the lookup table may hold values for all indexes or may hold values only for indexes of some representative points. In a case where the lookup table holds values only for the indexes of the representative points, the first connecting unit 135 may calculate the threshold value for an index other than the representative points by interpolation.

Referring to FIG. 4 again, the processing after the first connecting processing in the step S11 will be described. In step S12 after completion of the first connecting processing in the step S11, the first pixel value determination unit 133 determines whether the pixel value of the target pixel among the plurality of pixels is peculiar (determination of a first condition). When it is determined that the pixel value of the target pixel is peculiar (YES in the step S12), the process proceeds to step S13. When it is determined that the pixel value of the target pixel is not peculiar (NO in the step S12), the process proceeds to step S15. In this case, the target pixel is not a correction target.

The determination in the step S12 will be described in more detail. Also in this description, it is assumed that the value of N is one, that is, a pixel that is not connected to another pixel is set as the isolated point.

The first pixel value determination unit 133 compares pixel values in a pixel region (neighboring pixel group) in three rows and three columns including the target pixel and eight neighboring pixels in the vicinity thereof. The eight neighboring pixels are arranged so as to surround the target pixel. When the pixel value of the target pixel is the largest among the pixel values of the pixel region, the first pixel value determination unit 133 determines that the pixel value of the target pixel is a convex peculiar value. When the pixel value of the target pixel is the smallest among the pixel values of the pixel region, the first pixel value determination unit 133 determines that the pixel value of the target pixel is a concave peculiar value. When the pixel value of the target pixel is neither the largest nor the smallest among the pixel values of the pixel region, the first pixel value determination unit 133 determines that the pixel value of the target pixel is not peculiar. The first pixel state holding unit 134 holds information indicating these determination results in the data area corresponding to the target pixel.

In FIG. 5B, the 2-bit value described in the center of the circle corresponding to each pixel is concave-convex data indicating whether or not the pixel value of the pixel is the largest or the smallest in a pixel region of three rows and three columns including the pixel (target pixel) and eight pixels in the vicinity of the pixel. When the bit on the left side of the concave-convex data is one, the pixel value of the pixel is the largest in the pixel regions of three rows and three columns. When the bit on the right side of the concave-convex data is one, the pixel value of the pixel is the smallest in the pixel regions of three rows and three columns. For example, in the pixel P11, the value of the concave-convex data is "01", and the pixel value of the pixel P11 is the smallest (that is, a concave peculiar value) in the pixel regions of three rows and three columns. In addition, in the pixel P45, the value of the concave-convex data is "10", and the pixel value of the pixel P45 is the largest (that is, a convex peculiar value) in the pixel region of three rows and three columns.

The first connection number determination unit 137 determines whether or not the target pixel is a convex or concave isolated point based on the 8-bit connection data and the 2-bit concave-convex data (that is, 10-bit pixel state data in total) held in the first pixel state holding unit 134 (determination of a second condition). That is, in the step S13 when the pixel value of the target pixel is peculiar, the first connection number determination unit 137 determines whether the target pixel is an isolated point based on whether the connection number calculated from the connection data is equal to or less than the threshold value N (first threshold value). When it is determined that the pixel value of the target pixel is an isolated point (YES in the step S13), the process proceeds to step S14. In this case, the target pixel is a correction target. When it is determined that the pixel value of the target pixel is not an isolated point (NO in the step S13), the process proceeds to the step S15. In this case, the target pixel is not a correction target.

For example, when the pixel P45 having the concave-convex data value of "10" and the convex peculiar value is referred to, all the values of the 8-bit connection data are zero. Therefore, the connection number of the pixel P45 is one, and the pixel P45 is determined to be a convex isolated point in the processing of the step S13. Therefore, the pixel P45 is a correction target.

In addition, when the pixel P15 having the concave-convex data value of "01" and the concave peculiar value is referred to, all the values of the 8-bit connection data are zero. Therefore, the connection number of the pixel P15 is one, and the pixel P15 is determined to be a concave isolated point in the processing of the step S13. Therefore, the pixel P15 is also a correction target.

The pixel P43 is an isolated point because all the values of the 8-bit connection data are zero, but is not a peculiar value because the value of the concave-convex data is "00". Since it is determined in the step S12 that the pixel value is not peculiar and the process proceeds to the step S15, the pixel P43 is not a correction target.

Although not illustrated in FIG. 5B, in a pixel region of three rows and three columns including the target pixel and eight pixels in the vicinity of the target pixel, when all the pixel values of the nine pixels are the same value, the value of the concave-convex data may be "11" because the pixel value of the target pixel is the largest and the smallest. In this case, since the pixel values of the target pixel and the eight pixels in the vicinity of the target pixel are the same, the connection number of the target pixel is nine or more, and thus the target pixel is not an isolated point and is not a correction target.

In the step S14, the correction unit 136 corrects the pixel value of the target pixel by replacing and outputting the pixel value of the target pixel with the correction value generated by the correction data generation unit 132. In the step S15, the correction unit 136 does not correct the pixel value of the target pixel. This processing may be outputting the pixel value held in the pixel data holding unit 131 as it is.

Although the correction processing in the correction data generation unit 132 is not particularly limited, for example, nine pixel values in a pixel region of three rows and three columns including one target pixel and eight neighboring pixels may be referred to, and a median value of the nine pixel values may be used as a correction value. Alternatively, an average value or a weighted average value of the pixel region may be used as the correction value instead of the median value. Alternatively, a median value, an average value, or a weighted average value may be calculated using pixel values excluding a peculiar value among the nine pixel values of the pixel region.

The processing from the step S12 to the step S15 is performed for each of the plurality of pixels. The processing may be performed in parallel for each of the plurality of pixels, or may be performed sequentially for each of the plurality of pixels.

In addition, in the processing of the step S12, nine pixels in the pixel region of three rows and three columns including the target pixel and eight pixels in the vicinity thereof are referred to, but the range of the pixel region to be referred to is not limited thereto. For example, 25 pixels in a pixel region of five rows and five columns including the target pixel and 24 pixels in the vicinity thereof may be referred to.

In addition, in the determination of the convex or concave peculiar value in the step S12, whether the peculiar value is the maximum value or the minimum value in the pixel region is used as a determination criterion, but the determination criterion of the peculiar value is not limited thereto. In the step S12, when the rank of the pixel value of the target pixel in the pixel region is higher than an upper limit of a predetermined range (second range), it may be determined to be convex, and when the rank of the pixel value of the target pixel in the pixel region is lower than a lower limit of the predetermined range, it may be determined to be concave. For example, when the predetermined range is the third to the seventh, it is determined that the pixel value of the target pixel is convex when the rank of the pixel value of the target pixel in the pixel region is the first (maximum) or the second, and it is determined that the pixel value of the target pixel is concave when the rank of the pixel value of the target pixel in the pixel region is the ninth (minimum) or the eighth. When the upper limit of the predetermined range is set to the second and the lower limit of the predetermined range is set to the rank of the number obtained by subtracting one from the number of pixels in the pixel region, the same processing as that in the case where whether the upper limit is the maximum value or the minimum value in the pixel region is used as the determination criterion is performed. That is, when the rank of the pixel value of the target pixel in the pixel region is the first (maximum), it is determined to be convex, and when the rank of the pixel value of the target pixel in the pixel region is the lowest (minimum), it is determined to be concave.

In the above example, in order to simplify the description, the case where the value of the threshold value N of the connection number in the determination of an isolated point is one, that is, the case where a pixel that is not connected to another pixel is set as an isolated point has been described, but the value of the threshold value N may be two or more. By setting the value of the threshold value N to two or more, it is possible to perform determination in consideration of the connected abnormal pixels. Hereinafter, in consideration of the case where the value of the threshold value N is set to a value other than one in the correction processing of the present embodiment, the correction processing will be described in a more generalized manner. In this case, a pixel included in the first connected pixel group in which the number of connected pixels is N or less is an isolated point.

First, the isolated point determination processing in the step S13 of FIG. 4 will be described with reference to FIGS. 8A and 8B. In this description, it is assumed that the value of the threshold value N of the isolated point is three.

Figure 8A:
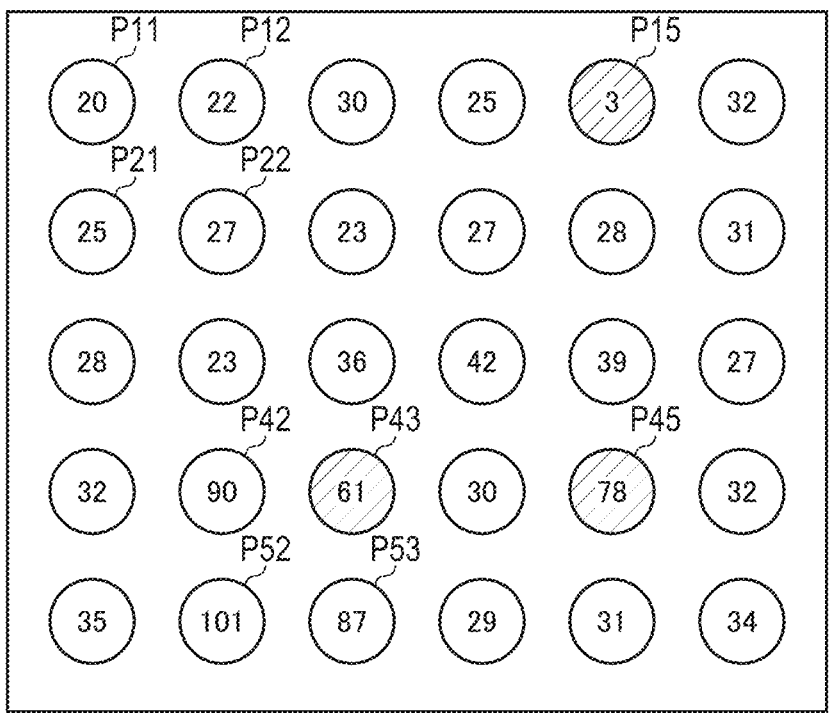
FIG. 8A is a diagram schematically illustrating an example of pixel values and FIG. 8B is a diagram schematically illustrating an example of pixel states in the correction processing according to the first embodiment.

FIG. 8A is a diagram schematically illustrating an example of pixel values in the correction processing according to the present embodiment. FIG. 8B is a diagram schematically illustrating an example of pixel states in the correction processing according to the present embodiment. In FIGS. 8A and 8B, the notation methods in these figures are similar to those in FIGS. 5A and 5B. The pixel values, the connection data, and the concave-convex data illustrated in FIGS. 8A and 8B are also the same as those illustrated in FIGS. 5A and 5B.

Figure 8B:
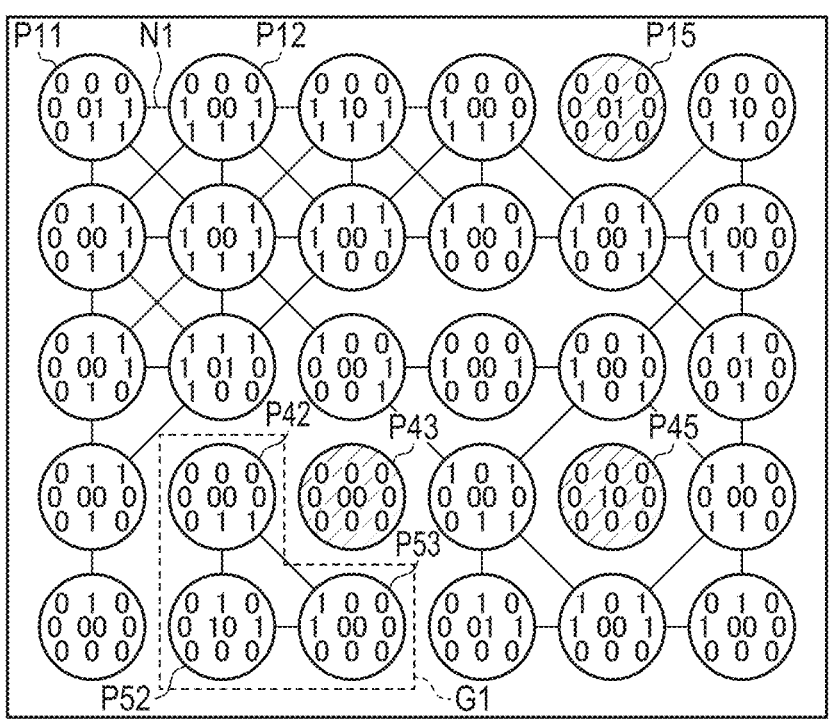

In FIGS. 8A and 8B, the hatched pixels P15, P43, and P45 are not connected to other pixels, and the connection number of them is one, that is, the connection number is equal to or less than a threshold value (N=3), and therefore the pixels P15, P43, and P45 are isolated points. This is similar to that illustrated in FIGS. 5A and 5B.

In FIG. 8B, a first connected pixel group G1 indicated by a broken line includes pixels P42, P52, and P53. Referring to connection data of the pixels P42, P52, and P53, the pixels P42, P52, and P53 are connected to each other. Therefore, the connection number of the pixels P42, P52, and P53 in the first connected pixel group G1 is three. That is, since the connection number of the pixels is equal to or less than the threshold value (N=3), the pixels P42, P52, and P53 are also isolated points. The connection number can be determined by tracking the connection relationship with reference to the connection data of each pixel.

Next, the determination processing of the correction target in the steps S12 and S13 of FIG. 4 in a case where the threshold value N of the connection number is two or more will be described.

The determination of the convex isolated point or the concave isolated point with respect to the target pixel is the same as that in the case where the threshold value N is one. However, when the threshold value N of the connection number is two or more, the number of pixels in the first connected pixel group may be plural, and in this case, it may not be determined that all the pixels in the first connected pixel group are isolated points of the same type. For example, in the example of FIG. 8B, the pixel value of the pixel P52 among the pixels P42, P52, and P53 is convex. However, the pixel values of the pixels P42 and P53 are not convex because there is the pixel P52 in the vicinity.

As described above, in a case where the connection number is two or more, when at least one pixel determined to be convex is included in the first connected pixel group determined to be an isolated point, all pixels in the first connected pixel group are determined to be convex isolated points. When at least one pixel determined to be concave is included in the first connected pixel group determined to be an isolated point, all pixels in the first connected pixel group are determined to be concave isolated points. That is, in any case, all the pixels of the first connected pixel group are to be corrected (the step S14 in FIG. 4). When neither a pixel determined to be convex nor a pixel determined to be concave is included in the first connected pixel group determined to be an isolated point, all the pixels in the first connected pixel group are not to be corrected (the step S15 in FIG. 4).

The first connected pixel group determined to be an isolated point may include both a pixel determined to be convex and a pixel determined to be concave. In one embodiment, exception processing corresponding to such a case is determined. As a specific example of the exception processing, all the pixels of the first connected pixel group may be convex isolated points, or all the pixels of the first connected pixel group may be concave isolated points. Further, as another specific example of the exception processing, all the pixels of the first connected pixel group may not be corrected on the assumption that they are neither convex isolated points nor concave isolated points.

In the above-described example, it is assumed that the same correction processing is performed on the pixels in the first connected pixel group determined to be isolated points, but the processing is not limited thereto. For example, only pixels determined to be convex or concave in the first connected pixel group determined to be an isolated point may be set as correction targets.

The threshold value N of the connection number may be set to a different value between the convex isolated point and the concave isolated point. The value of the threshold value N of the connection number may be changed for each imaging frame period of the photoelectric conversion device.

The data reference range in the processing of determining the connection number in the step S13 will be described in more detail. The first connection number determination unit 137 determines the connection number by referring to a data region of pixels in a range of (2N−1)×(2N−1) centered on the target pixel among the data held in the first pixel state holding unit 134.

The reason the reference range of the data area is set as described above will be described. When it is determined that the number of pixels that can be reached by tracing the pixels connected with the target pixel as the starting point is equal to or less than N including the target pixel, it can be said that the connection number of the first connected pixel group including the target pixel is equal to or less than N. In addition, when N pixels are linearly connected in the same direction from a pixel adjacent to the target pixel, the connection number is (N+1) or more. Therefore, in order to determine whether the connection number is equal to or greater than (N+1), it is sufficient to refer to pixel states in the range of (N−1) pixels from the target pixel in the vertical and horizontal directions. In other words, it is possible to determine whether the connection number is equal to or less than N by referring to a data region of pixels in a range of (2N−1)×(2N−1) centered on the target pixel.

As an example, a case where the threshold value N of the connection number is two will be described. In this case, the first connection number determination unit 137 determines the connection number with reference to pixels in a range of 3×3 centered on the target pixel, that is, data areas of the target pixel and eight pixels around the target pixel. When the target pixel and its surrounding pixels are not connected, the connection number of the first connected pixel group including the target pixel is one. When the target pixel and two or more surrounding pixels are connected, the connection number of the first connected pixel group including the target pixel is greater than two. When the target pixel and one pixel around the target pixel are connected to each other and the pixel to which the target pixel is connected is connected to the target pixel, the connection number of the first connected pixel group including the target pixel is two. When the target pixel and one pixel around the target pixel are connected to each other and the pixel to which the target pixel is connected is also connected to a pixel other than the target pixel, the connection number of the first connected pixel group including the target pixel is greater than two. By calculating the connection number in this manner, it is possible to determine whether the connection number is two or less.

When the determination of the connection number is performed, the first connecting processing by the first connecting unit 135 and the determination of the convex or concave peculiar value by the first pixel value determination unit 133 are completed for at least the pixels corresponding to the above-described data region. The first connecting unit 135 and the first pixel value determination unit 133 refer to pixel values of pixels in a range of 3×3 centered on the target pixel. Therefore, the range of the pixel values related to the determination of the connection number in the first connection number determination unit 137 is the range of $(2N+1)\times(2N+1)$.

In the present embodiment, in order to simplify the description, the pixel data holding unit 131 and the first pixel state holding unit 134 hold data of one frame. However, as described above, since the first connection number determination unit 137 refers to the data region of the pixels in the range of $(2N-1)\times(2N-1)$ centered on the target pixel, it is sufficient that there is data from the (N−1)-th row before the target pixel to the (N−1)-th row after the target pixel. However, in the processing of the first connecting unit 135, since the data of the (N−1)-th row from the target pixel is compared with the data of the N-th row from the target pixel, the data of the N-th row from the target pixel is also necessary. Therefore, the first pixel state holding unit 134 may be configured by a band memory having a storage capacity capable of holding data from the (N−1)-th row before the target pixel to the N-th row after the target pixel.

In addition, the first connecting unit 135, the first pixel value determination unit 133, the first connection number determination unit 137, and the correction data generation unit 132 refer to a data region of pixels in a range of 3×3 centered on the target pixel from the pixel data holding unit 131. Here, a target pixel of the first connecting unit 135 and the first pixel value determination unit 133 is at the (N−1)-th row after a target pixel in the processing of the correction data generation unit 132. Therefore, the pixel data holding unit 131 may be configured by a band memory having a storage capacity capable of holding data of about (N+1) rows.

In addition, in the determination of the connection state in the first connection number determination unit 137, an algorithm for determining the connection number such as Union-Find may be used. Also in this case, since it is sufficient to refer to the data area of the pixels in the range of $(2N-1)\times(2N-1)$ centered on the target pixel in order to determine whether the connection number is equal to or less than N, the above-described band memory can be applied.

As described above, according to the present embodiment, in the correction processing of abnormal pixels, abnormal pixels connected by the number equal to or less than the threshold value N can be detected and corrected. The value of N can be appropriately set in accordance with the occurrence status of abnormal pixels and the like. Therefore, according to the present embodiment, an information processing device and an information processing method capable of more suitably correcting an abnormal pixel are provided.

In addition, in the processing of the present embodiment, position information of the abnormal pixels acquired in advance and an image captured in the light-shielded state are not necessary. Therefore, the abnormal pixel can be corrected more easily. In addition, the storage capacity of the information processing device can be reduced because the storage capacity for holding the data is not necessary.

Second Embodiment

In the present embodiment, a modified example of the correction processing of the first embodiment will be described. In the present embodiment, description of elements common to those of the first embodiment may be omitted or simplified.

An object may include a pattern such as a line pattern, and the pixel value may be a peculiar value due to such a pattern. This peculiar pixel value is due to the pattern of the object and should not be corrected. A pixel group having such a peculiar pixel value is called a texture. In the texture, pixels having large fluctuations of pixel values may appear at a relatively high density.

In the present embodiment, a configuration example in which a part of a texture is prevented from being erroneously corrected by determining whether a target pixel is a pixel constituting the texture in the correction processing of the first embodiment will be described.

Figure 9:
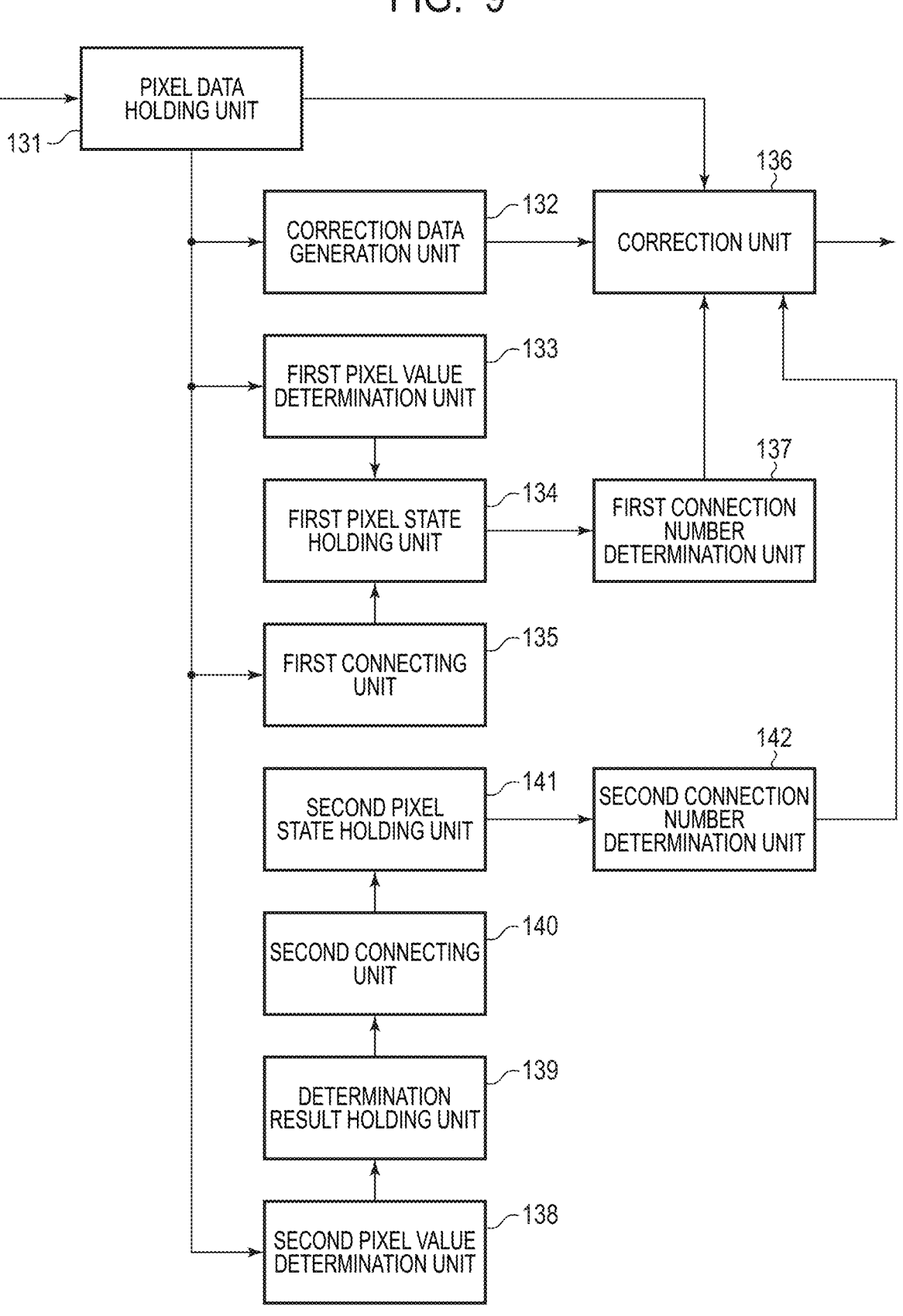
FIG. 9 is a functional block diagram related to a correction processing function of the information processing device according to a second embodiment.

FIG. 9 is a functional block diagram related to the correction processing function of the information processing device 1 according to the present embodiment. The information processing device 1 further includes a second pixel value determination unit 138, a determination result holding unit 139, a second connecting unit 140, a second pixel state holding unit 141, and a second connection number determination unit 142 in addition to the configuration similar to that of the first embodiment.

Functions of the determination result holding unit 139 and the second pixel state holding unit 141 are realized by, for example, the data storage unit 122 in FIG. 1. Functions of the second pixel value determination unit 138, the second connecting unit 140, and the second connection number determination unit 142 are realized by, for example, the information processing unit 129 in FIG. 1. Functions of the second pixel value determination unit 138, the second connecting unit 140, and the second connection number determination unit 142 may be realized by the CPU 125 executing a correction processing program. The correction processing program may be stored in advance in the data storage unit 122 or the ROM 127, or may be acquired from another device via the communication unit 128. The operation of each of these units will be described later.

Figure 10:
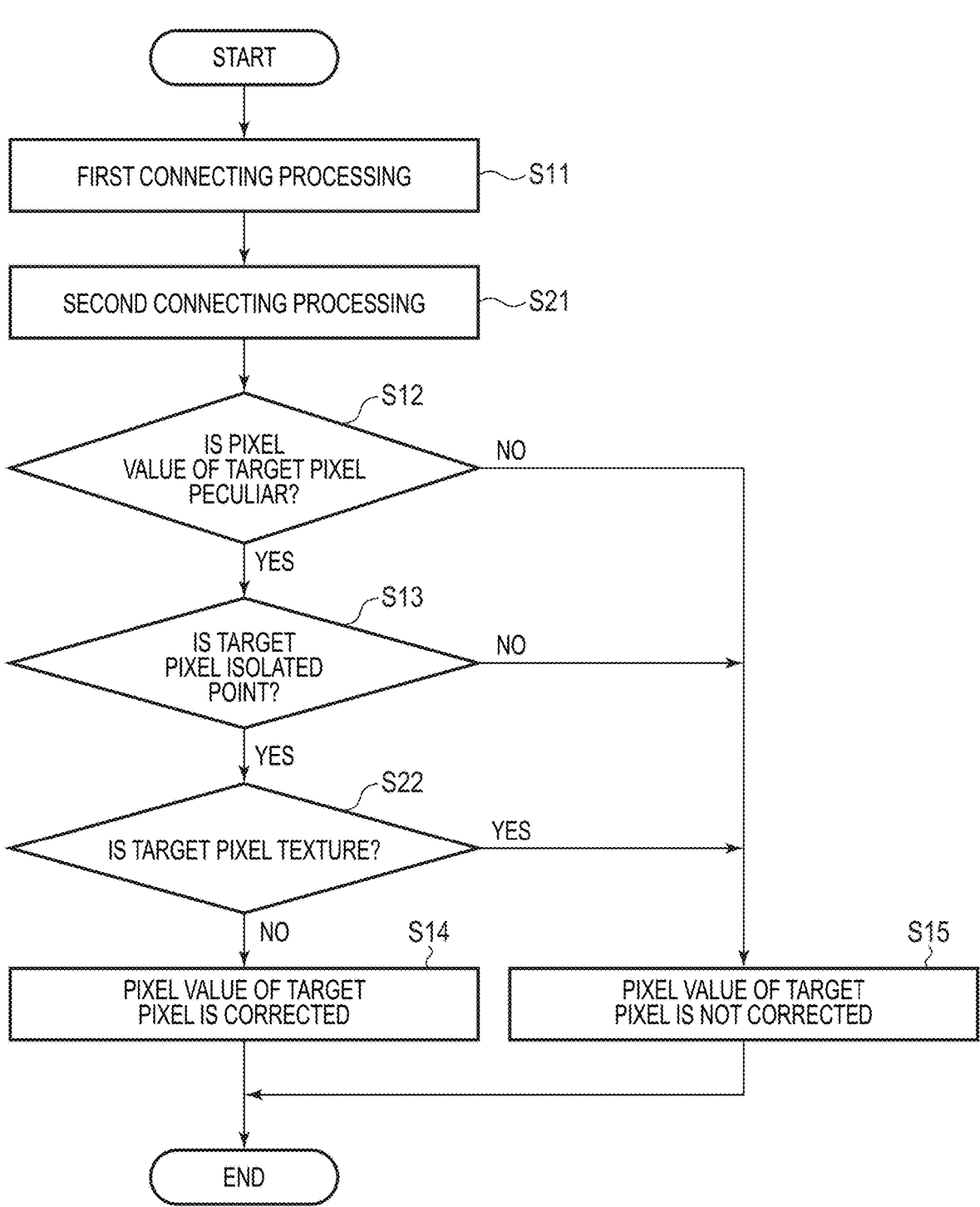
FIG. 10 is a flowchart illustrating correction processing executed by the information processing device according to the second embodiment.

FIG. 10 is a flowchart illustrating correction processing executed by the information processing device 1 according to the present embodiment. The correction processing method of the present embodiment will be described with reference to the flowchart of FIG. 10. In the flowchart of FIG. 10, since steps S11, S12, S13, S14, and S15 are the same as those of FIG. 4, the description thereof will be omitted or simplified.

Figure 11:
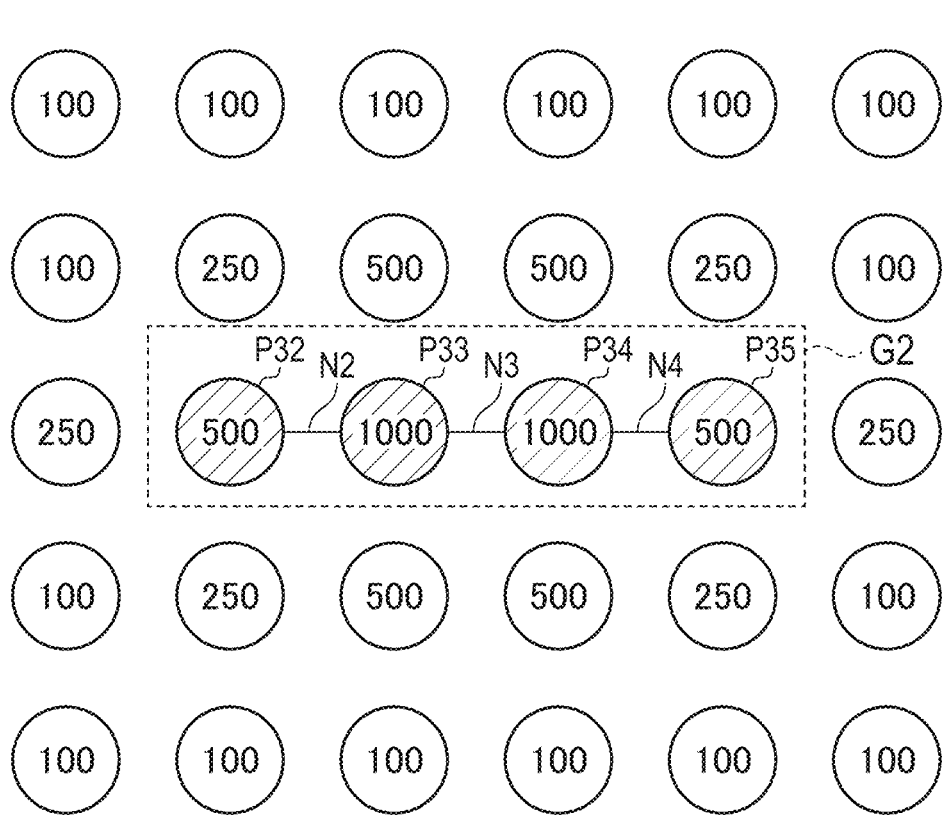
FIG. 11 is a diagram schematically illustrating an example of pixel values in the correction processing according to the second embodiment.

In step S21, the second pixel value determination unit 138, the determination result holding unit 139, the second connecting unit 140, and the second pixel state holding unit 141 perform connecting processing of pixels having a high pixel value (second connecting processing). Regarding the second connecting processing, the operation of each unit will be described with reference to FIG. 11. FIG. 11 is a diagram schematically illustrating an example of pixel values in the correction processing according to the present embodiment.

The second pixel value determination unit 138 acquires the pixel value of each of the plurality of pixels constituting the image from the pixel data holding unit 131. Then, the second pixel value determination unit 138 determines whether the pixel value of the target pixel is high with reference to the representative value determined by the pixel values of a pixel region of three rows and three columns including the target pixel and eight pixels in the vicinity thereof. Note that the representative value is, for example, a median value of pixel values of the pixel region of three rows and three columns including the target pixel and the eight pixels in the vicinity thereof, and the representative value is assumed to be a median value in the following description.

First, a pixel P32 in FIG. 11 is focused on. The pixel value of the pixel P32 is "500". A median value (representative value) of pixel values of a pixel region of three rows and three columns including the pixel P32 and eight pixels in the vicinity thereof is "250". Therefore, the pixel value of the pixel P32 is determined to be high. Next, a pixel P33 in FIG. 11 will be focused on. The pixel value of the pixel P33 is "1000". A median value (representative value) of pixel values of a pixel region of three rows and three columns including the pixel P33 and eight pixels in the vicinity thereof is "500". Therefore, the pixel value of the pixel P33 is determined to be high. When the same determination is performed for the other pixels, in the example of FIG. 11, four pixels P32, P33, P34, and P35 which are hatched are determined as pixels having high pixel values.

The determination result holding unit 139 holds information indicating the determination result by the second pixel value determination unit 138 for each pixel. This information may be, for example, 1-bit data per pixel, such as "1" for a pixel having a high pixel value and "0" for a pixel not having a high pixel value.

The second connecting unit 140 refers to the information held in the determination result holding unit 139, and determines that, when both of two adjacent pixels (first pixel and second pixel) have high pixel values, the two pixels belong to the same second connected pixel group (second connecting processing). The second pixel state holding unit 141 holds information indicating the determination result of the second connecting processing in the same format as the connection data described in the first embodiment. Processing in which the second connecting unit 140 determines that two pixels belong to the same second connected pixel group and the second pixel state holding unit 141 holds the pixel states of these pixels may also be expressed as "connecting".

In the example of FIG. 11, the pixel P32 and the pixel P33 are connected by the connection line N2, the pixel P33 and the pixel P34 are connected by the connection line N3, and the pixel P34 and the pixel P35 are connected by the connection line N4. Therefore, the connection number of the pixels P32, P33, P34, and P35 in the second connected pixel group G2 is four.

With reference to FIG. 10 again, the processing after the second connecting processing in the step S21 will be described. In the present embodiment, when it is determined in the step S13 that the pixel value of the target pixel is an isolated point (YES in the step S13), the process proceeds to step S22. In the step S22, the second connection number determination unit 142 determines whether the target pixel is a texture based on whether the connection number calculated from the connection data held in the second pixel state holding unit 141 is greater than a threshold value M (second threshold value) (determination of a third condition). The threshold value M is a positive integer, and, in one embodiment, M is 2 or more from the viewpoint of detecting that high pixel values are connected. When the connection number is greater than the threshold value M (YES in the step S22), it is determined that the target pixel is a texture, and the process proceeds to the step S15. In this case, the target pixel is not a correction target. When the connection number is equal to or less than the threshold value M (NO in the step S22), it is determined that the target pixel is not a texture, and the process proceeds to the step S14. In this case, the target pixel is a correction target. In the step S14 or the step S15, the correction unit 136 performs the same pixel value output processing as in the first embodiment.

For the same reason as described in the first embodiment, the data reference range in the processing of determining the connection number in the step S22 is in the range of $(2M-1) \times (2M-1)$. That is, the second connection number determination unit 142 determines the connection number with reference to a data region of pixels in a range of $(2M-1) \times (2M-1)$ centered on the target pixel among the data held in the second pixel state holding unit 141.

For example, when the value of the threshold value M is three, the connection number of pixels P32, P33, P34, and P35 in the second connected pixel group G2 is four in the example of FIG. 11, and thus the pixels P32, P33, P34, and P35 are textures. Therefore, the correction processing is not performed on the pixels P32, P33, P34, and P35.

FIGS. 12A to 12D are graphs illustrating examples of threshold values used in the second pixel value determination unit 138 to determine whether the pixel value of the target pixel is high based on the representative value. In FIGS. 12A to 12D, the horizontal axis represents a representative value calculated from pixel values of a pixel region of three rows and three columns including a target pixel and eight pixels in the vicinity thereof, and the vertical axis represents a pixel value of the target pixel. In FIGS. 12A to 12D, the straight line L6 has a slope of one and an intercept of zero (that is, $y=x$).

Figure 12A:
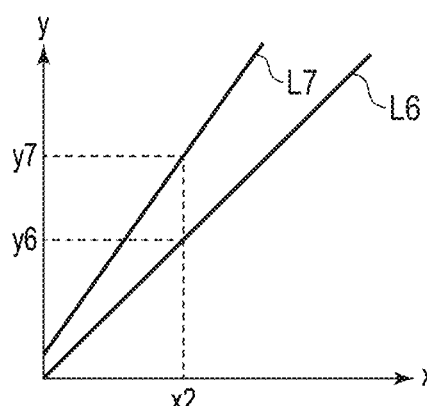
FIGS. 12A, 12B, 12C, and 12D are graphs illustrating examples of threshold values in the correction processing according to the second embodiment.

In FIG. 12A, a straight line L7 indicates a lower limit threshold value at which it is determined that the pixel value of the target pixel is high. The slope of the straight line L7 is greater than one, and the intercept of the straight line L7 is greater than zero. On the straight line L7, when $x=x2$, $y=y7$. When the representative value is x2, and when the pixel value of the target pixel is equal to or greater than y7, it is determined that the pixel value of the target pixel is high.

Figure 12B:
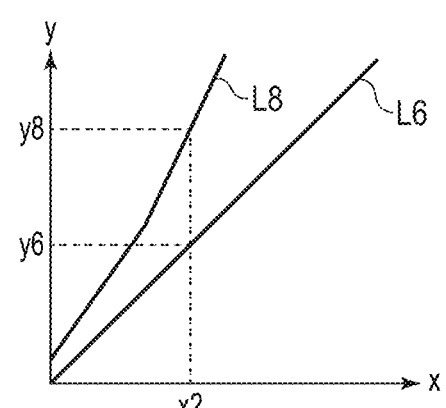

Function for determining the threshold values is not limited to those illustrated in FIG. 12A. For example, as illustrated in FIG. 12B, the lower limit threshold value may be given by a polygonal line L8 constituted by a plurality of line segments. On the line L8, when $x=x2$, $y=y8$. When the representative value is x2, and when the pixel value of the target pixel is equal to or greater than y8, it is determined that the pixel value of the target pixel is high.

Figure 12C:
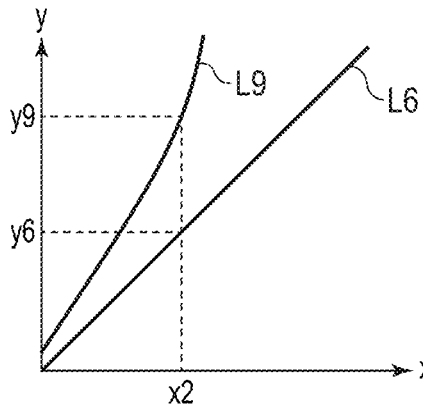

Alternatively, for example, as illustrated in FIG. 12C, the lower limit threshold value may be given by a curve L9. On the line L9, when $x=x2$, $y=y9$. When the representative value is x2, and when the pixel value of the target pixel is equal to or greater than y9, it is determined that the pixel value of the target pixel is high.

Figure 12D:
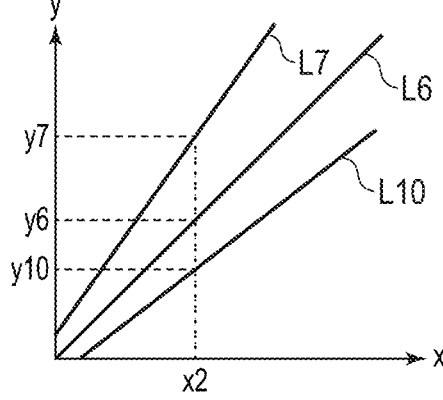

In the above-described example, the second pixel value determination unit 138 determines that the pixel value of the target pixel is high based on the representative value, but may determine that the pixel value of the target pixel is low based on the representative value. In this case, when the pixel value of the target pixel is low, it can be determined that the target pixel is a texture. When such a determination condition is applied, an upper limit threshold value may be given by a straight line L10 as illustrated in FIG. 12D, for example. The slope of the straight line L10 is less than one and the intercept of the straight line L10 is less than zero. On the straight line L10, when x=x2, y=y10. When the representative value is x2, and when the pixel value of the target pixel is equal to or less than y10, it is determined that the pixel value of the target pixel is low.

Both the determination when the pixel value of the target pixel is high and the determination when the pixel value of the target pixel is low may be performed. In this example, when the representative value is x2, it is determined that the pixel value of the target pixel is high when the pixel value of the target pixel is equal to or greater than y7, and it is determined that the pixel value of the target pixel is low when the pixel value of the target pixel is equal to or less than y10. That is, the determination of the second pixel value determination unit 138 in the present embodiment can be said that to determine that the difference between the pixel value of the target pixel and the representative value is outside the predetermined range (outside the third range or outside the fourth range).

In the example of FIG. 12D, one or both of the straight line L7 and the straight line L10 may be replaced by a polygonal line or a curve. The straight line L7 and the straight line L10 may be replaced by different types of lines.

The lower limit threshold value and the upper limit threshold value described above can be acquired by the same method as the method of acquiring the threshold value used in the processing of the first connecting unit 135 described in the first embodiment. That is, the lower limit threshold value and the upper limit threshold value may be calculated by a function or may be obtained by a lookup table. In addition, the lower limit threshold value and the upper limit threshold value may be the same as or different from the threshold value used in the processing of the first connecting unit 135 described in the first embodiment.

In the example of FIG. 12D, when both the determination of the pixel value of the target pixel being high and the determination of the pixel value of the target pixel being low are performed, the threshold value M of the connection number between the texture having the high pixel value and the texture having the low pixel value may be different values. The value of the threshold value M of the connection number may be changed for each imaging frame period of the photoelectric conversion device.

In the present embodiment, in order to simplify the description, the pixel data holding unit 131 and the second pixel state holding unit 141 hold data of one frame. However, as described above, since the second connection number determination unit 142 refers to the data region of the pixels in the range of (2M−1)×(2M−1) centered on the target pixel, it is sufficient that there is data from the (M−1)-th row before the target pixel to the (M−1)-th row after the target pixel. However, in the processing of the second connecting unit 140, since the data of the (M−1)-th row from the target pixel is compared with the data of the M-th row after the target pixel, the data of the M-th row from the target pixel is also necessary. Therefore, the second pixel state holding unit 141 may be configured by a band memory having a storage capacity capable of holding data from the (M−1)-th row before the target pixel to the M-th row after the target pixel.

In addition, the second pixel value determination unit 138 refers to a data region of pixels in a range of 3×3 centered on the target pixel from the pixel data holding unit 131. Then, the second pixel state holding unit 141 holds the determination results of the correction data generation unit 132 and the second connection number determination unit 142 up to the M-th row after the target pixel. Therefore, the pixel data holding unit 131 needs to hold information up to the (M+1)-th row after the target pixel. Further, the correction data generation unit 132 also refers to a data area of pixels in a range of 3×3 centered on the target pixel. As described above, the pixel data holding unit 131 may be configured by a band memory having a storage capacity capable of holding data of about (M+2) rows. However, this is not the case when N>M.

In addition, in the determination of the connection state in the second connection number determination unit 142, an algorithm for determining the connection number such as Union-Find may be used. Also in this case, since it is sufficient to refer to the data area of the pixels in the range of (2M−1)×(2M−1) centered on the target pixel in order to determine whether the connection number is equal to or less than M, the above-described band memory can be applied.

As described above, according to the present embodiment, an information processing device and an information processing method capable of obtaining the same effects as those of the first embodiment are provided. Further, in the present embodiment, the influence on the image quality due to the erroneous correction of the texture can be reduced by determining the texture and excluding the texture from the correction target.

In the above description, it is assumed that an image to be processed is a grayscale image, but similar processing can be applied to an image including data of a plurality of channels such as a color image. In this case, the same processing can be performed by applying the processing of the present embodiment to a channel image in which data of the same channel (data of the same color) is collected.

Hereinafter, an application example to a Bayer image which is an example of an image including data of a plurality of channels will be described. Here, the Bayer image refers to an image before demosaic processing, which is captured by an imaging device in which color filters of a Bayer arrangement are arranged. The Bayer image has a repeating arrangement having two rows and two columns as basic units. Among the two rows and the two columns, a red pixel (R) and a green pixel (Gr) are arranged in the first row, and a green pixel (Gb) and a blue pixel (B) are arranged in the second row.

In the Bayer image, one channel of data is held in one pixel. For example, when there is a red line-shaped texture on the image, high pixel values of a line shape may appear in a red (R) channel. On the other hand, when there is a white line-shaped texture on the image, high pixel values of a line shape may appear in all channels of red (R), green (Gr, Gb), and blue (B). In consideration of these, a modified example will be described in which the processing contents are expanded so that the connecting processing in the second connecting unit 140 is performed for two types of channels between different channels and between the same channels.

Figure 13:
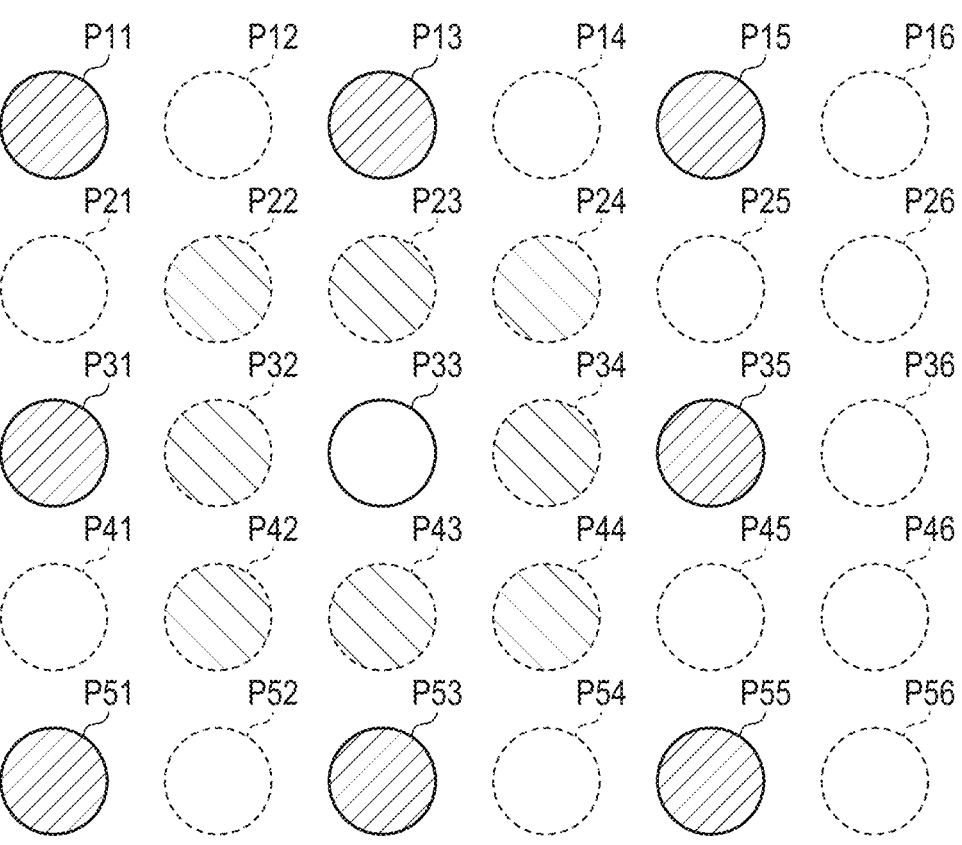
FIG. 13 is a diagram schematically illustrating an arrangement of pixels according to a modified example of the second embodiment.

FIG. 13 is a diagram schematically illustrating an arrangement of pixels according to a modified example of the present embodiment. In FIG. 13, a pixel P33 is a target pixel. In FIG. 13, pixels indicated by solid line circles (pixels P11, P13, P31, and the like) are pixels of the same channel as the target pixel P33, and pixels indicated by broken line circles (pixels P12, P22, P32, and the like) are pixels of a channel different from the target pixel. The pixels P22, P23, P24, P32, P34, P42, P43, and P44 are pixels of a channel different from the target pixel P33 and adjacent to the target pixel P33. The pixels P11, P13, P15, P31, P35, P51, P53, and P55 are pixels of the same channel as the target pixel P33, and are adjacent to the target pixel P33 in a channel image in which pixels of the same channel are collected. The second connecting unit 140 sets the above-described pixels P22, P23, P24, P32, P34, P42, P43, and P44 and the pixels P11, P13, P15, P31, P35, P51, P53, and P55 as candidates to which the target pixel P33 is to be connected. Accordingly, it is possible to perform the connecting processing in consideration of both the texture of one color and the texture of white. In the present modified example, since the number of pixels to be connected is 16, the connection data is 16-bit data.

Third Embodiment

In the present embodiment, a modified example of the correction processing of the second embodiment will be described. In the present embodiment, description of elements common to the first embodiment or the second embodiment may be omitted or simplified.

In the second embodiment, an example has been described in which a pixel determined to be a texture is excluded from a correction target. However, an abnormal pixel having a pixel value extremely different from that of surrounding pixels may be included in the textures. In the present embodiment, a configuration example in which an abnormal pixel in the textures is detected and corrected will be described.

Figure 14:
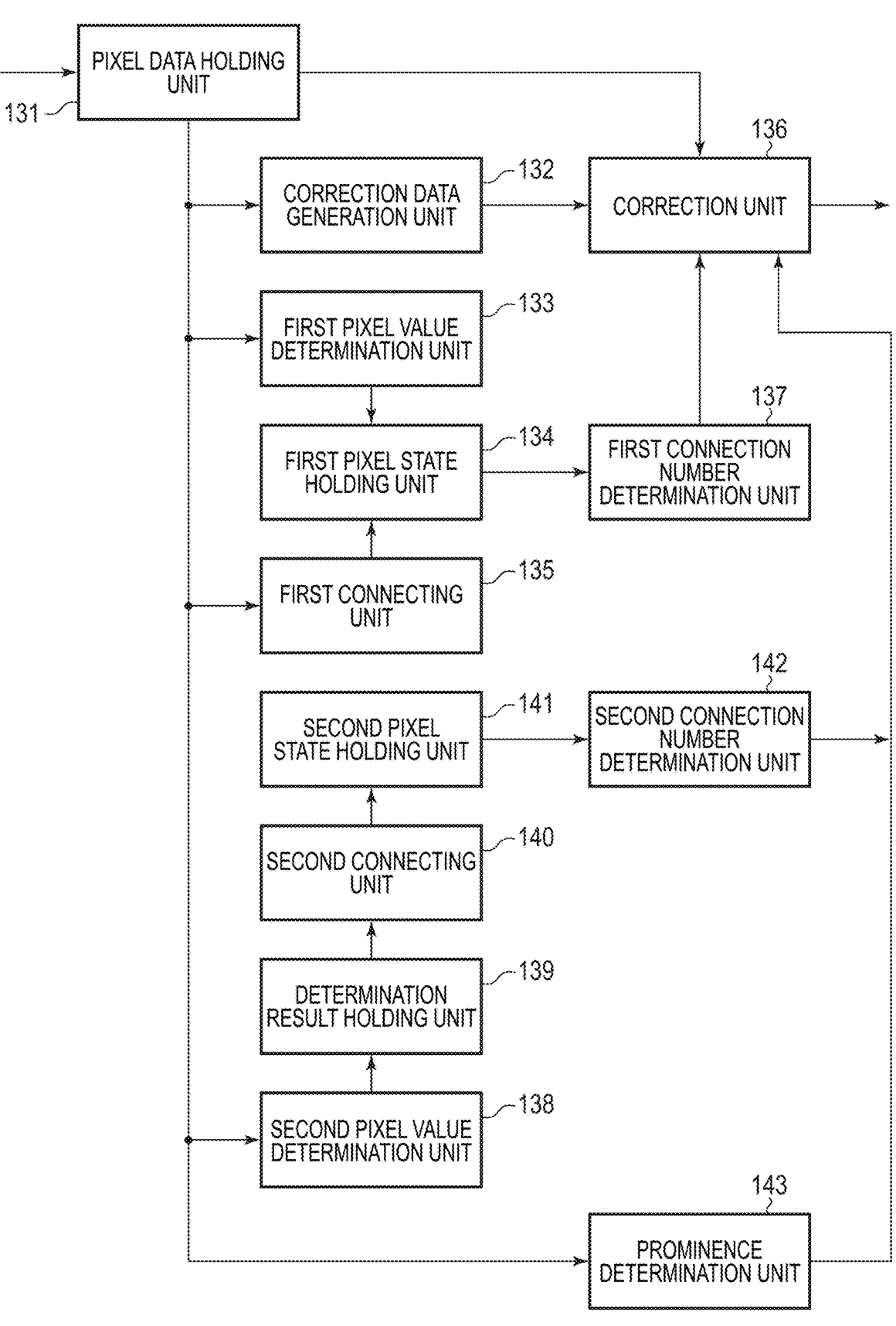
FIG. 14 is a functional block diagram related to a correction processing function of the information processing device according to a third embodiment.

FIG. 14 is a functional block diagram related to the correction processing function of the information processing device 1 according to the present embodiment. The information processing device 1 further includes a prominence determination unit 143 in addition to the configuration similar to that of the second embodiment.

A function of the prominence determination unit 143 is realized by, for example, the information processing unit 129 in FIG. 1. The function of the prominence determination unit 143 may be realized by the CPU 125 executing the correction processing program. The correction processing program may be stored in advance in the data storage unit 122 or the ROM 127, or may be acquired from another device via the communication unit 128. The operation of the unit will be described later.

Figure 15:
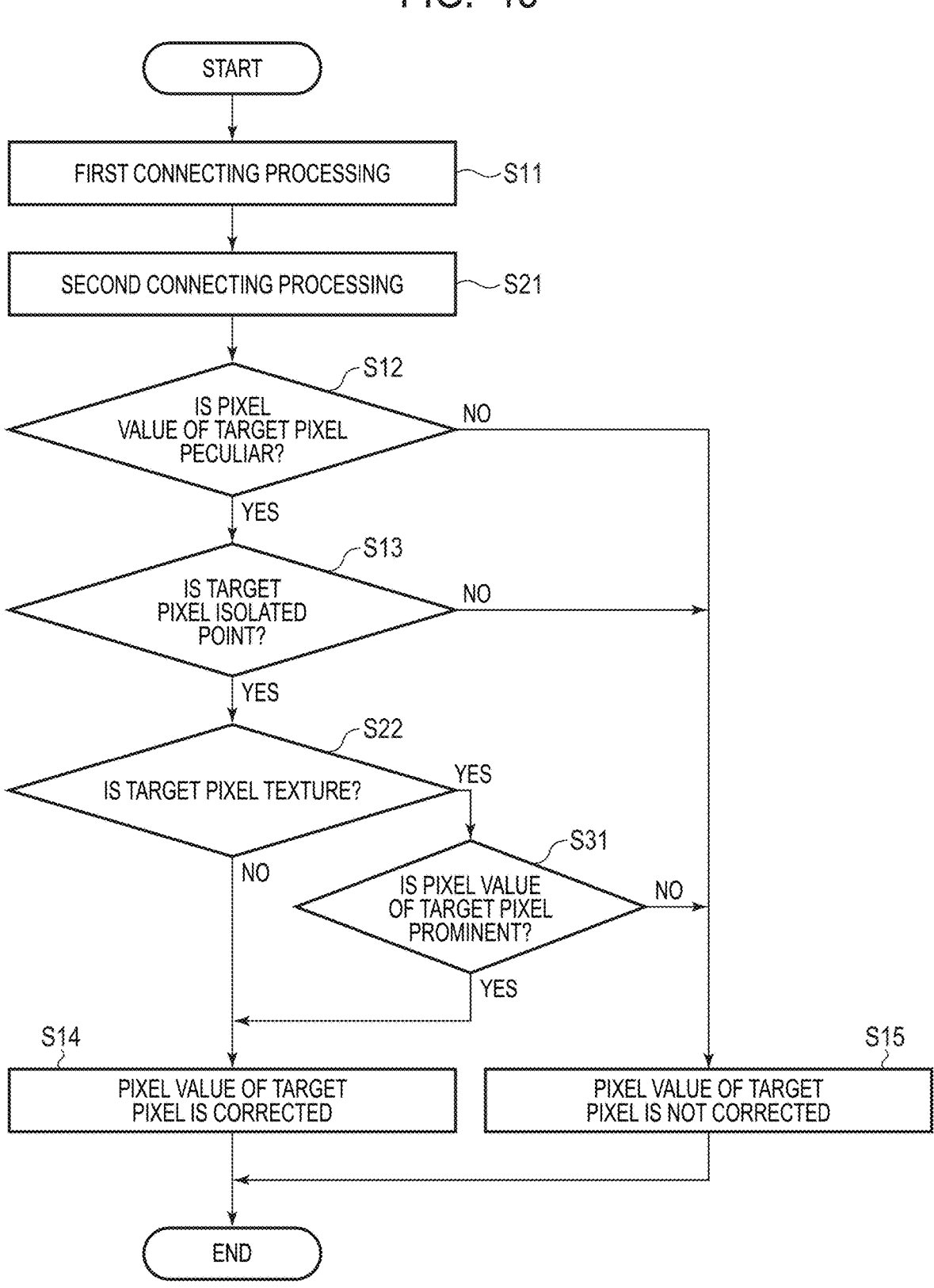
FIG. 15 is a flowchart illustrating correction processing executed by the information processing device according to the third embodiment.

FIG. 15 is a flowchart illustrating correction processing executed by the information processing device 1 according to the present embodiment. The correction processing method of the present embodiment will be described with reference to the flowchart of FIG. 15. In the flowchart of FIG. 15, since steps S11, S12, S13, S14, S15, S21, and S22 are the same as those of FIG. 10, the description thereof will be omitted or simplified.

In the present embodiment, when the connection number is greater than the threshold value M in the step S22 (YES in the step S22), the process proceeds to step S31. In the step S31, the prominence determination unit 143 determines whether the pixel value of the target pixel is prominent with reference to pixel values of a pixel region of three rows and three columns including the target pixel and eight pixels in the vicinity thereof (determination of a fourth condition). When it is determined that the pixel value of the target pixel is prominent (YES in the step S31), the process proceeds to the step S14. In this case, the target pixel is a correction target. When it is not determined that the pixel value of the target pixel is prominent (NO in the step S31), the process proceeds to the step S15. In this case, the target pixel is not a correction target.

Here, the state in which the pixel value is prominent refers to a state in which the pixel value of the target pixel is extremely convex or extremely concave with respect to the surrounding pixels. The term "extremely convex" refers to, for example, a situation in which the pixel value is equal to or greater than a threshold value (third threshold value). Further, "extremely concave" refers to, for example, a situation in which the pixel value is equal to or less than a threshold value (fourth threshold value). More specific examples of "extremely convex" and "extremely concave" will be described. When the pixel value of the target pixel is the largest among the pixel values of the target pixel and the eight pixels in the vicinity thereof, and the pixel value of the target pixel is Q times (Q is a number equal to or greater than one) or more (third threshold value or more) the largest pixel value among the eight pixels excluding the target pixel, the pixel value of the target pixel is assumed to be extremely convex. In addition, when the pixel value of the target pixel is the smallest among the target pixel and the eight pixels in the vicinity thereof, and the pixel value of the target pixel is (1/Q) times or less (fourth threshold value or less) with respect to the smallest pixel value among the eight pixels excluding the target pixel, the pixel value of the target pixel is assumed to be extremely concave. This threshold value setting method is merely an example, and threshold values as illustrated in FIGS. 12A to 12D may be set, for example.

Figure 16:
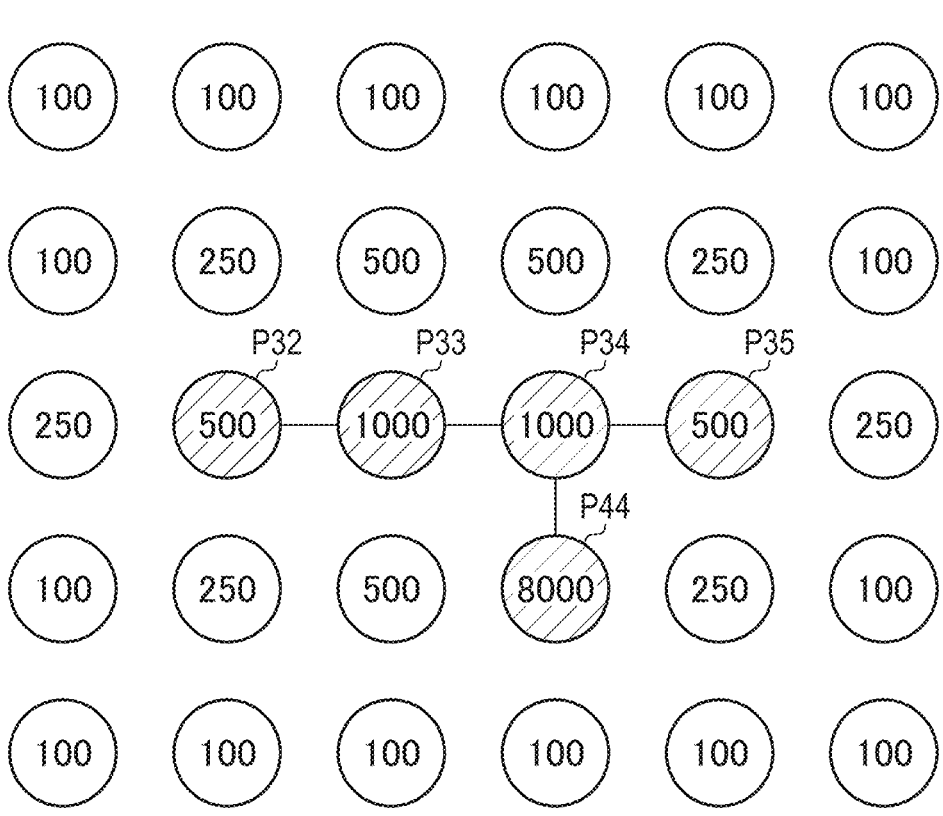
FIG. 16 is a diagram schematically illustrating an example of pixel values in the correction processing according to the third embodiment.

Hereinafter, a specific example of the processing of the prominence determination unit 143 will be described on the assumption that M is three and Q is three. FIG. 16 is a diagram schematically illustrating an example of pixel values in the correction processing according to the present embodiment. FIG. 16 illustrates an example in which a pixel P44 has an extremely large pixel value "8000". When the pixel P44 is a target pixel, pixel values of a pixel region of three rows and three columns including eight pixels in the vicinity of the pixel P44 is referred to. In this case, since the pixel value "8000" of the pixel P44 is three times or more larger than the second largest pixel value "1000" of a pixel P33 or a pixel P34, it is an extremely convex pixel value. Further, when the determination is performed by the method described in the second embodiment, since the connection number of pixels P32, P33, P34, P35, and P44 is five and is greater than the threshold value M, these are textures. In this embodiment, in such a case, the pixels P32, P33, P34, and P35 are determined not to be corrected, but since the pixel P44 is an extremely convex and prominent, it is determined to be a correction target.

As described above, according to the present embodiment, an information processing device and an information processing method capable of obtaining the same effects as those of the second embodiment are provided. In the present embodiment, an abnormal pixel in the textures can be detected and corrected.

Fourth Embodiment

In the present embodiment, another example of the texture determination processing in the second embodiment will be described. In the present embodiment, description of elements common to the first embodiment or the second embodiment may be omitted or simplified.

Figure 17:
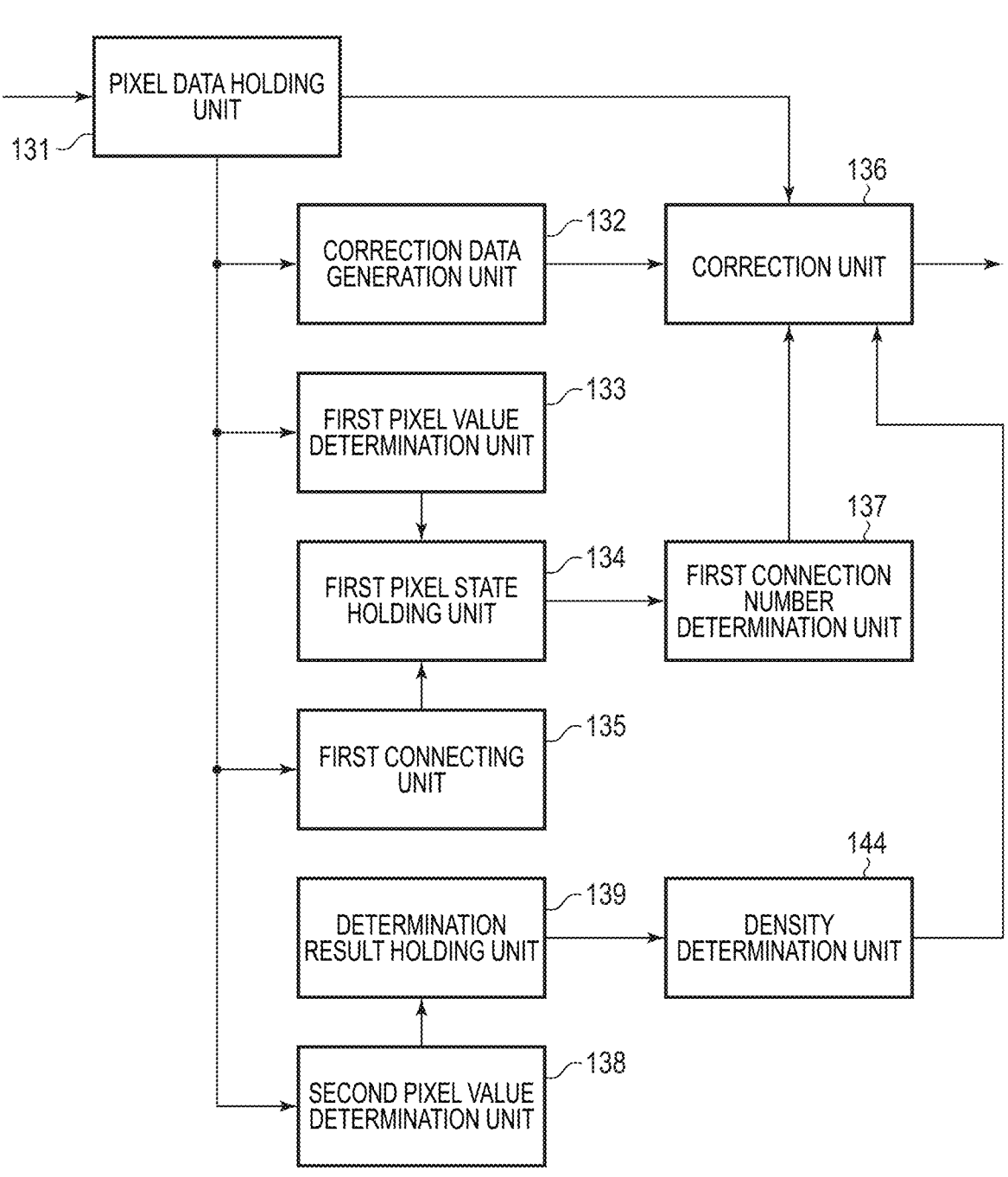
FIG. 17 is a functional block diagram related to a correction processing function of the information processing device according to a fourth embodiment.

FIG. 17 is a functional block diagram related to the correction processing function of the information processing device 1 according to the present embodiment. The information processing device 1 further includes a density determination unit 144 instead of the second connecting unit 140, the second pixel state holding unit 141, and the second connection number determination unit 142 in FIG. 9.

A function of the density determination unit 144 is realized by, for example, the information processing unit 129 in FIG. 1. The function of the density determination unit 144 may be realized by the CPU 125 executing the correction processing program. The correction processing program may be stored in advance in the data storage unit 122 or the ROM 127, or may be acquired from another device via the communication unit 128. The operation of the unit will be described later.

Figure 18:
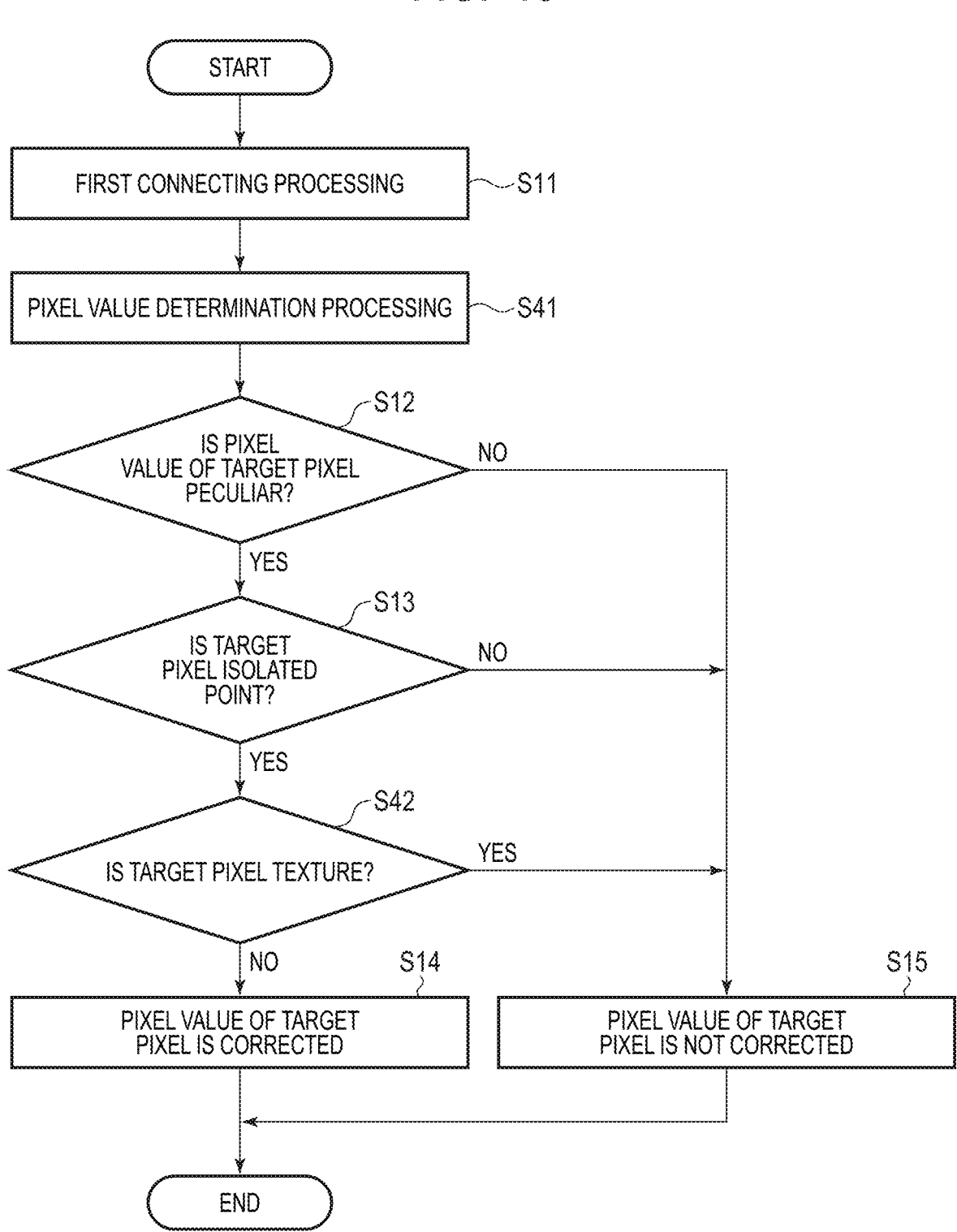
FIG. 18 is a flowchart illustrating correction processing executed by the information processing device according to the fourth embodiment.

FIG. 18 is a flowchart illustrating correction processing executed by the information processing device 1 according to the present embodiment. The correction processing method of the present embodiment will be described with reference to the flowchart of FIG. 18. In the flowchart of FIG. 18, since steps S11, S12, S13, S14, and S15 are the same as those of FIG. 10, the description thereof will be omitted or simplified.

In step S41, the second pixel value determination unit 138 and the determination result holding unit 139 perform determination processing of a pixel having a high pixel value (pixel value determination processing). This processing is substantially the same as the processing of the second pixel value determination unit 138 and the determination result holding unit 139 described in the second embodiment. That is, the second pixel value determination unit 138 determines whether the pixel value of the target pixel is high with reference to a representative value determined by pixel values of a pixel region of three rows and three columns including the target pixel and eight pixels in the vicinity thereof. The determination result holding unit 139 holds information indicating the determination result of the second pixel value determination unit 138 for each pixel. As described in the second embodiment, the pixel value determination processing may be determining a pixel having a low pixel value. That is, it can be said that the determination of the second pixel value determination unit 138 in the present embodiment is determining that a difference between the pixel value of the target pixel and the representative value is outside a predetermined range (outside a fifth range).

In the present embodiment, when it is determined in the step S13 that the pixel value of the target pixel is an isolated point (YES in the step S13), the process proceeds to step S42. In the step S42, the density determination unit 144 acquires the determination result held in the determination result holding unit 139, and calculates the number of pixels determined to have a high pixel value in a pixel region of five rows and five columns including the target pixel and 24 pixels in the vicinity thereof. In other words, the density determination unit 144 calculates the density of pixels whose pixel values are determined to be high within a predetermined range including the target pixel. The density determination unit 144 determines whether the target pixel is a texture based on whether the number of pixels determined to have a high pixel value is greater than a threshold value R (fifth threshold value) (determination of a fifth condition). Although the threshold value R is a positive integer, in one embodiment, R is two or more from the viewpoint of detecting that pixels having high pixel values are present at high density. When the number of pixels determined to have a high pixel value is greater than the threshold value R (YES in the step S42), it is determined that the target pixel is a texture, and the process proceeds to the step S15. In this case, the target pixel is not a correction target. When the number of pixels determined to have a high pixel value is equal to or less than the threshold value R (NO in the step S42), it is determined that the target pixel is not a texture, and the process proceeds to the step S14. In the step S14 or the step S15, the correction unit 136 performs the same pixel value output processing as in the first embodiment.

Figure 19:
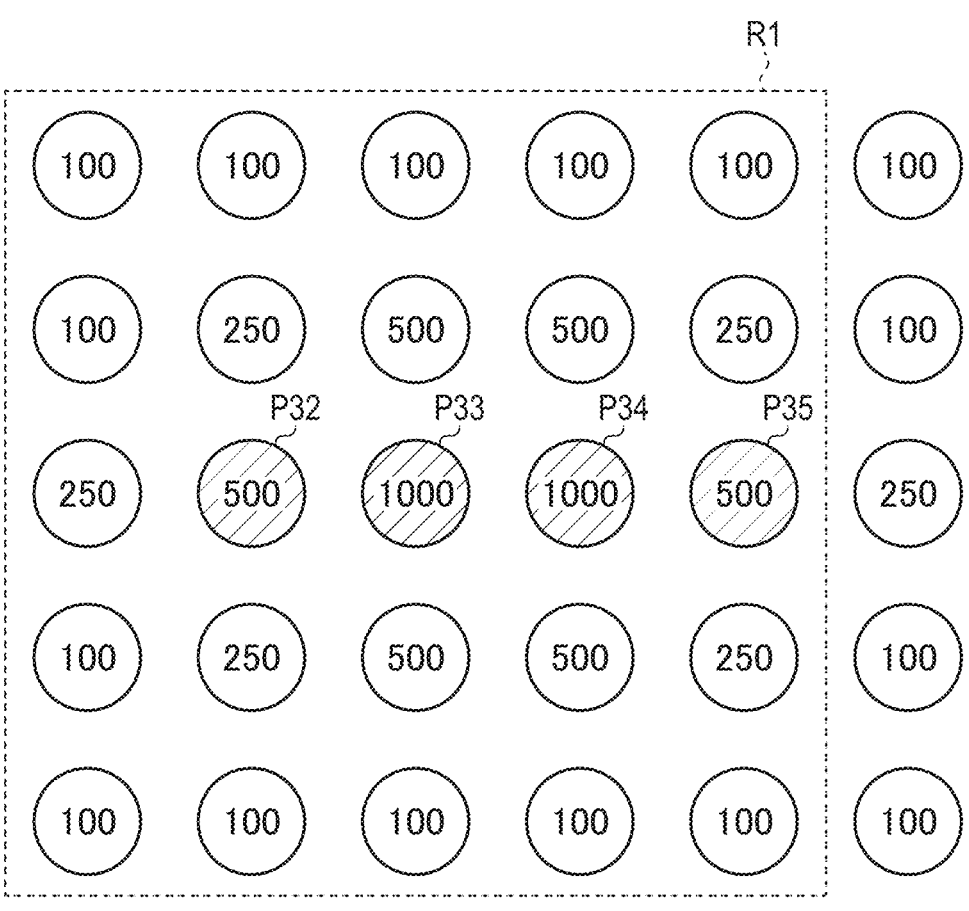
FIG. 19 is a diagram schematically illustrating an example of pixel values in the correction processing according to the fourth embodiment.

FIG. 19 is a diagram schematically illustrating an example of pixel values in the correction processing according to the present embodiment. A specific example of the processing of the present embodiment will be described on the assumption that the threshold value R in the above-described processing is three. In the example of FIG. 19, as in FIG. 11, four pixels P32, P33, P34, and P35 that are hatched are determined as pixels having high pixel values. In a pixel region R1 of five rows and five columns including the pixel P33 as the target pixel and 24 pixels in the vicinity thereof, there are four pixels determined to have a high pixel value. Since the number is greater than the threshold value R, the density determination unit 144 determines that the pixel P33 is a texture and excludes the pixel P33 from the correction target.

In the present embodiment, in order to simplify the description, the pixel data holding unit 131 and the determination result holding unit 139 hold data of one frame. However, as described above, since the density determination unit 144 refers to the data region of the pixel region R1 in the vicinity of the target pixel, it is sufficient that there is data corresponding to the number of rows of the pixel region R1. Therefore, the determination result holding unit 139 may be configured by a band memory having a storage capacity capable of holding data corresponding to the number of rows of the pixel region R1 referred to in the processing of the density determination unit 144.

In addition, the correction data generation unit 132 refers to a data region of pixels in a range of 3×3 centered on the target pixel. Then, the second pixel value determination unit 138 refers to the data region of the pixels in the range of 3×3 centered on a pixel of the last row in the pixel region R1 in the vicinity of the target pixel. Therefore, the pixel data holding unit 131 may be configured by a band memory having a storage capacity capable of holding data from one row before the target pixel to the next row of the last row of the pixel region R1 in the vicinity of the target pixel.

As described above, according to the present embodiment, an information processing device and an information processing method capable of obtaining the same effects as those of the first embodiment are provided. Further, in the present embodiment, similarly to the second embodiment, the influence on the image quality due to the erroneous correction of the texture can be reduced by determining the texture and excluding the texture from the correction target.

The method of detecting and correcting an abnormal pixel in the textures described in the third embodiment is also applicable to the present embodiment.

Fifth Embodiment

In the present embodiment, a specific configuration example of a photoelectric conversion device including an avalanche photodiode, which can be applied to the data input unit 121 of the information processing device 1 according to the first to fourth embodiments, will be described. The configuration example of the present embodiment is an example, and the photoelectric conversion device applicable to the data input unit 121 is not limited thereto.

Figure 20:
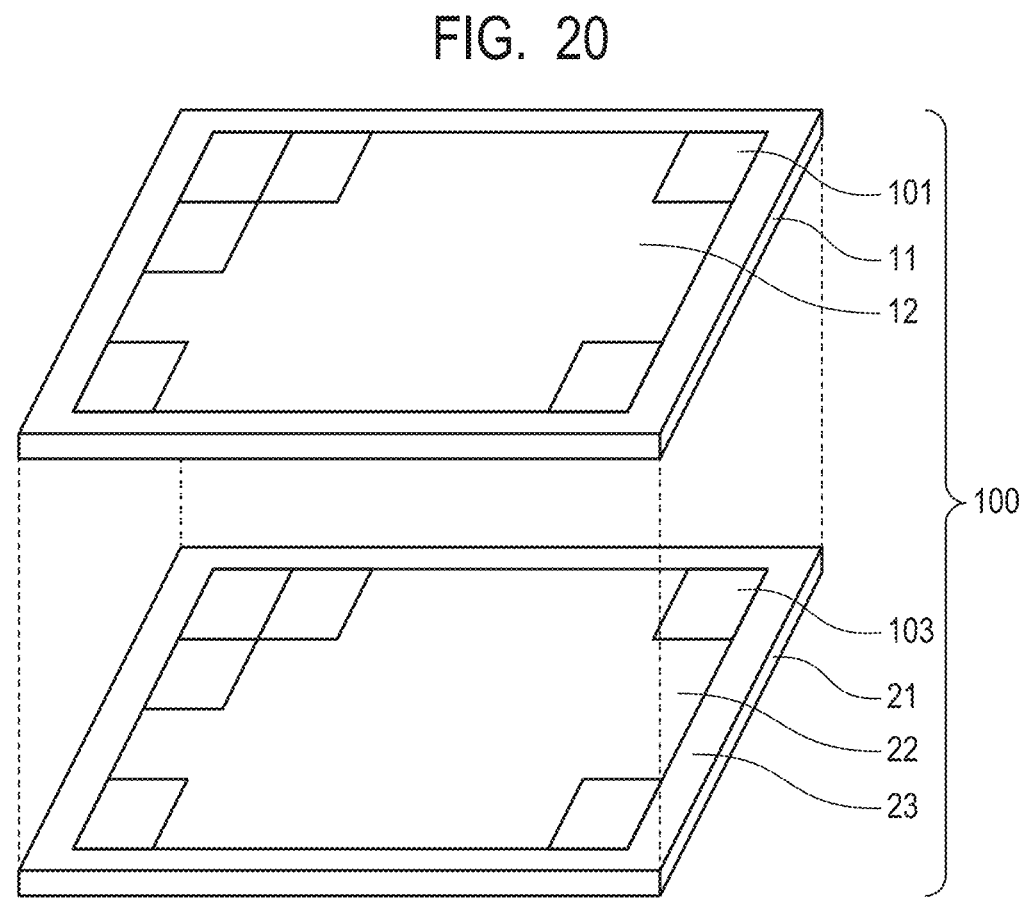

FIG. 20 is a schematic diagram illustrating an overall configuration of the photoelectric conversion device 100 according to the present embodiment. The photoelectric conversion device 100 includes a sensor substrate 11 (first substrate) and a circuit substrate 21 (second substrate) stacked. The sensor substrate 11 and the circuit substrate 21 are electrically connected to each other. The sensor substrate 11 has a pixel region 12 in which a plurality of pixel circuits 101 are arranged to form a plurality of rows and a plurality of columns. The circuit substrate 21 includes a first circuit region 22 in which a plurality of pixel signal processing units 103 are arranged to form a plurality of rows and a plurality of columns, and a second circuit region 23 arranged outside the first circuit region 22. The second circuit region 23 may include a circuit for controlling the plurality of pixel signal processing units 103. The sensor substrate 11 has a light incident surface for receiving incident light and a connection surface opposed to the light incident surface. The sensor substrate 11 is connected to the circuit substrate 21 on the connection surface side. That is, the photoelectric conversion device 100 is a so-called backside illumination type.

In this specification, the term "plan view" refers to a view from a direction perpendicular to a surface opposite to the light incident surface. The cross section indicates a surface in a direction perpendicular to a surface opposite to the light incident surface of the sensor substrate 11. Although the light incident surface may be a rough surface when viewed microscopically, in this case, a plan view is defined with reference to the light incident surface when viewed macroscopically.

In the following description, the sensor substrate 11 and the circuit substrate 21 are diced chips, but the sensor substrate 11 and the circuit substrate 21 are not limited to chips. For example, the sensor substrate 11 and the circuit substrate 21 may be wafers. When the sensor substrate 11 and the circuit substrate 21 are diced chips, the photoelectric conversion device 100 may be manufactured by being diced after being stacked in a wafer state, or may be manufactured by being stacked after being diced.

Figure 21:
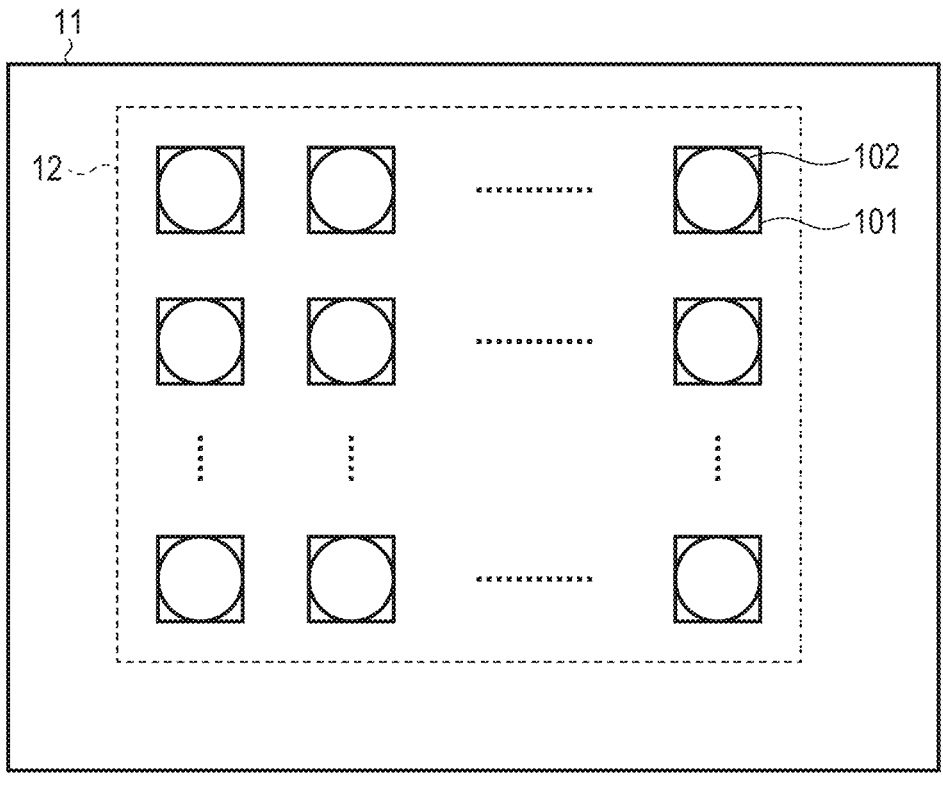
FIG. 21 is a schematic block diagram illustrating a configuration example of a sensor substrate according to the fifth embodiment.

FIG. 21 is a schematic block diagram illustrating an arrangement example of the sensor substrate 11. In the pixel region 12, a plurality of pixel circuits 101 are arranged to form a plurality of rows and a plurality of columns. Each of the plurality of pixel circuits 101 includes a photoelectric conversion unit 102 including an avalanche photodiode (hereinafter referred to as APD) as a photoelectric conversion element in the substrate.

Of the charge pairs generated in the APD, the conductivity type of the charge used as the signal charge is referred to as a first conductivity type. The first conductivity type refers to a conductivity type in which a charge having the same polarity as the signal charge is a majority carrier. Further, a conductivity type opposite to the first conductivity type, that is, a conductivity type in which a majority carrier is a charge having a polarity different from that of a signal charge is referred to as a second conductivity type. In the APD described below, the anode of the APD is set to a fixed potential, and a signal is extracted from the cathode of the APD. Accordingly, the semiconductor region of the first conductivity type is an N-type semiconductor region, and the semiconductor region of the second conductivity type is a P-type semiconductor region. Note that the cathode of the APD may have a fixed potential and a signal may be extracted from the anode of the APD. In this case, the semiconductor region of the first conductivity type is the P-type semiconductor region, and the semiconductor region of the second conductivity type is then N-type semiconductor region. Although the case where one node of the APD is set to a fixed potential is described below, potentials of both nodes may be varied.

Figure 22:
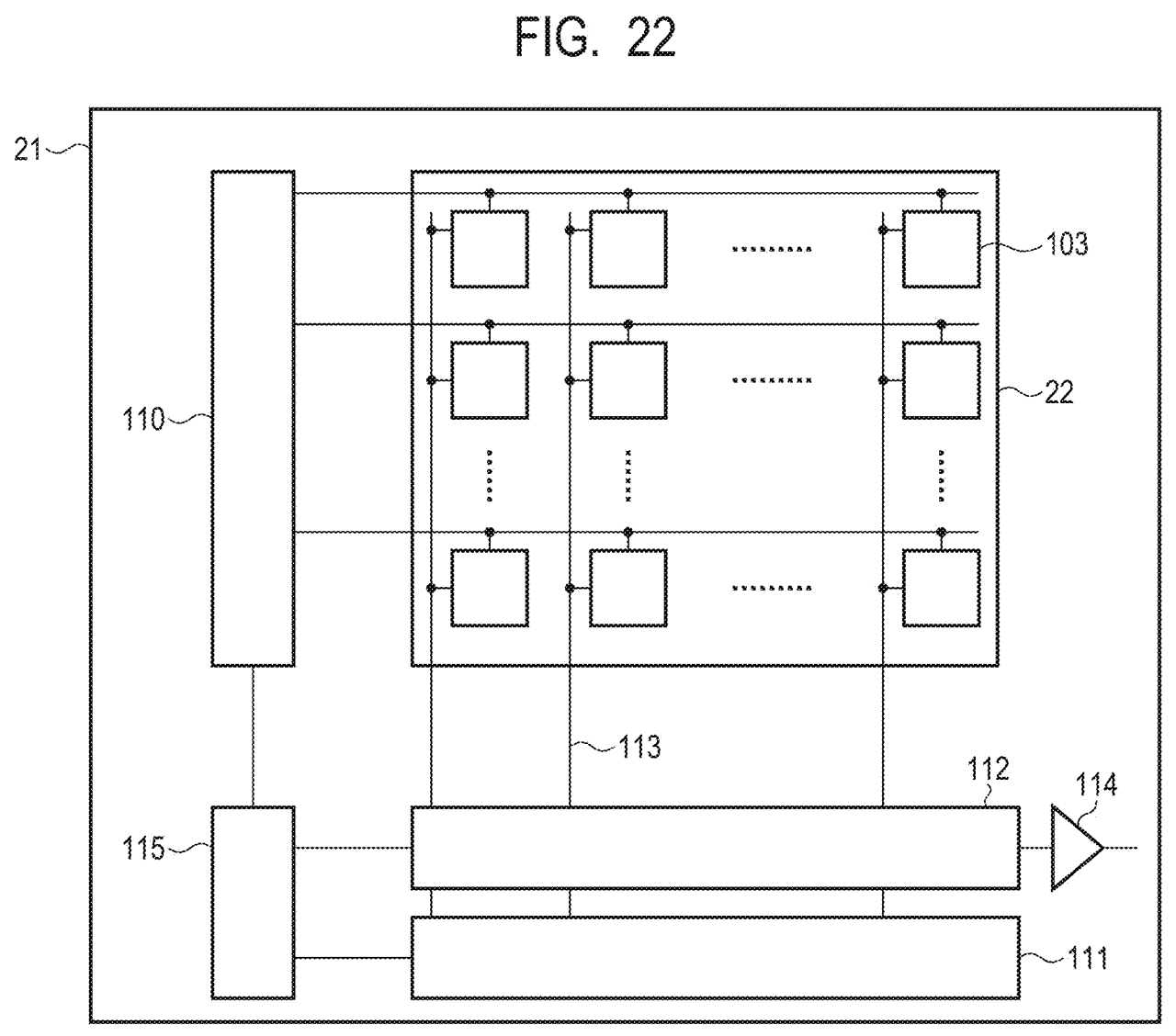

FIG. 22 is a schematic block diagram illustrating a configuration example of the circuit substrate 21. The circuit substrate 21 has the first circuit region 22 in which a plurality of pixel signal processing units 103 are arranged to form a plurality of rows and a plurality of columns.

The circuit substrate 21 includes a vertical scanning circuit 110, a horizontal scanning circuit 111, a reading circuit 112, a pixel output signal line 113, an output circuit 114, and a control signal generation unit 115. The plurality of photoelectric conversion units 102 illustrated in FIG. 21 and the plurality of pixel signal processing units 103 illustrated in FIG. 22 are electrically connected to each other via connection wirings provided for each pixel circuits 101.

The control signal generation unit 115 is a control circuit that generates control signals for driving the vertical scanning circuit 110, the horizontal scanning circuit 111, and the reading circuit 112, and supplies the control signals to these units. As a result, the control signal generation unit 115 controls the driving timings and the like of each unit.

The vertical scanning circuit 110 supplies control signals to each of the plurality of pixel signal processing units 103 based on the control signal supplied from the control signal generation unit 115. The vertical scanning circuit 110 supplies control signals for each row to the pixel signal processing unit 103 via a driving line provided for each row of the first circuit region 22. As will be described later, a plurality of driving lines may be provided for each row. A logic circuit such as a shift register or an address decoder can be used for the vertical scanning circuit 110. Thus, the vertical scanning circuit 110 selects a row to be output a signal from the pixel signal processing unit 103.

The signal output from the photoelectric conversion unit 102 of the pixel circuit 101 is processed by the pixel signal processing unit 103. The pixel signal processing unit 103 counts the number of pulses output from the APD included in the photoelectric conversion unit 102 to acquire and hold a digital signal having a plurality of bits.

It is not always necessary to provide one pixel signal processing unit 103 for each of the pixel circuits 101. For example, one pixel signal processing unit 103 may be shared by a plurality of pixel circuits 101. In this case, the pixel signal processing unit 103 sequentially processes the signals output from the photoelectric conversion units 102, thereby providing the function of signal processing to each pixel circuit 101.

The horizontal scanning circuit 111 supplies control signals to the reading circuit 112 based on a control signal supplied from the control signal generation unit 115. The pixel signal processing unit 103 is connected to the reading circuit 112 via a pixel output signal line 113 provided for each column of the first circuit region 22. The pixel output signal line 113 in one column is shared by a plurality of pixel signal processing units 103 in the corresponding column. The pixel output signal line 113 includes a plurality of wirings, and has at least a function of outputting a digital signal from the pixel signal processing unit 103 to the reading circuit 112, and a function of supplying a control signal for selecting a column for outputting a signal to the pixel signal processing unit 103. The reading circuit 112 outputs a signal to an external storage unit or signal processing unit of the photoelectric conversion device 100 via the output circuit 114 based on the control signal supplied from the control signal generation unit 115.

The arrangement of the photoelectric conversion units 102 in the pixel region 12 may be one-dimensional. Further, the function of the pixel signal processing unit 103 does not necessarily have to be provided one by one in all the pixel circuits 101. For example, one pixel signal processing unit 103 may be shared by a plurality of pixel circuits 101. In this case, the pixel signal processing unit 103 sequentially processes the signals output from the photoelectric conversion units 102, thereby providing the function of signal processing to each pixel circuit 101.

As illustrated in FIGS. 21 and 22, the first circuit region 22 having a plurality of pixel signal processing units 103 is arranged in a region overlapping the pixel region 12 in the plan view. In the plan view, the vertical scanning circuit 110, the horizontal scanning circuit 111, the reading circuit 112, the output circuit 114, and the control signal generation unit 115 are arranged so as to overlap a region between an edge of the sensor substrate 11 and an edge of the pixel region 12. In other words, the sensor substrate 11 includes the pixel region 12 and a non-pixel region arranged around the pixel region 12. In the circuit substrate 21, the second circuit region 23 having the vertical scanning circuit 110, the horizontal scanning circuit 111, the reading circuit 112, the output circuit 114, and the control signal generation unit 115 is arranged in a region overlapping with the non-pixel region in the plan view.

Note that the arrangement of the pixel output signal line 113, the arrangement of the reading circuit 112, and the arrangement of the output circuit 114 are not limited to those illustrated in FIG. 22. For example, the pixel output signal lines 113 may extend in the row direction, and may be shared by a plurality of pixel signal processing units 103 in corresponding rows. The reading circuit 112 may be provided so as to be connected to the pixel output signal line 113 of each row.

Figure 23:
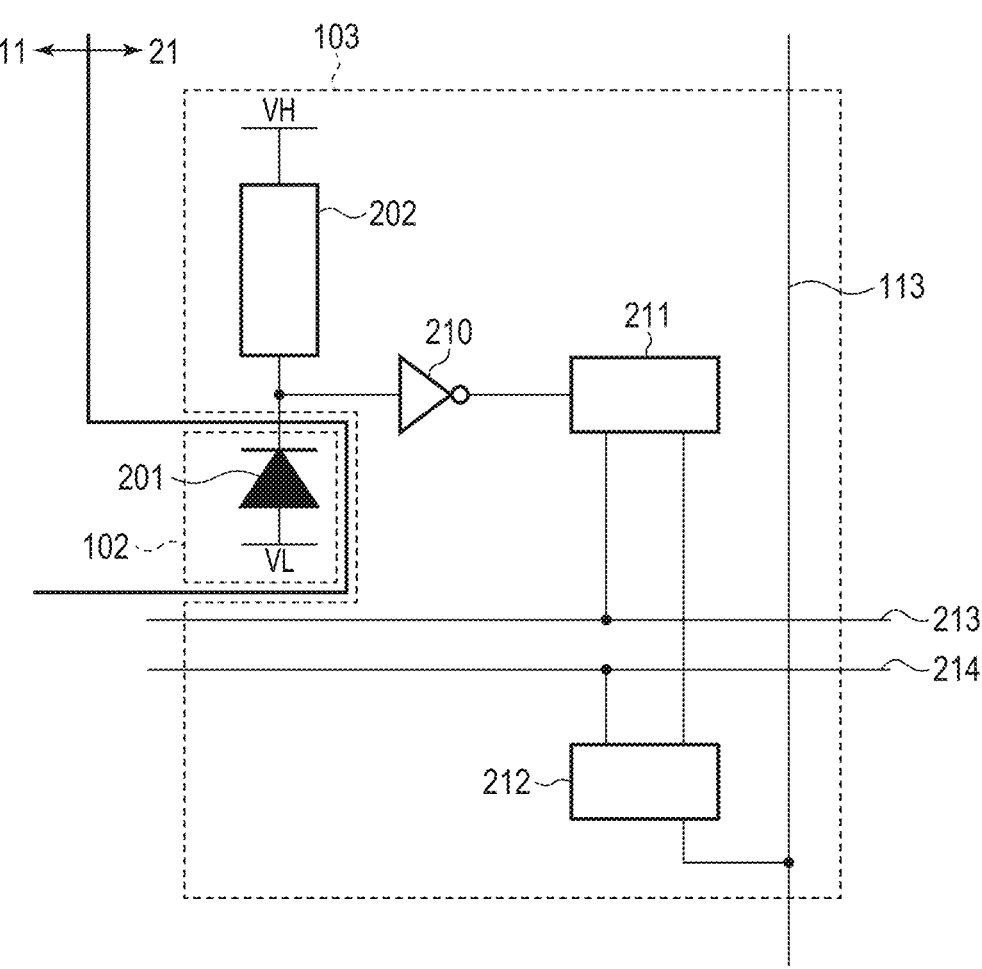
FIG. 23 is a schematic block diagram illustrating a configuration example of one pixel of a photoelectric conversion unit and a pixel signal processing unit according to the fifth embodiment.

FIG. 23 is a schematic block diagram illustrating a configuration example of one pixel of the photoelectric conversion unit 102 and the pixel signal processing unit 103 according to the present embodiment. FIG. 23 schematically illustrates a more specific configuration example including a connection relationship between the photoelectric conversion unit 102 arranged in the sensor substrate 11 and the pixel signal processing unit 103 arranged in the circuit substrate 21. In FIG. 23, driving lines between the vertical scanning circuit 110 and the pixel signal processing unit 103 in FIG. 22 are illustrated as driving lines 213 and 214.

The photoelectric conversion unit 102 includes an APD 201. The pixel signal processing unit 103 includes a quenching element 202, a waveform shaping unit 210, a counter circuit 211, and a selection circuit 212. The pixel signal processing unit 103 may include at least one of the waveform shaping unit 210, the counter circuit 211, and the selection circuit 212.

The APD 201 generates a charge pair corresponding to incident light by photoelectric conversion. A voltage VL (first voltage) is supplied to the anode of the APD 201. The cathode of the APD 201 is connected to a first terminal of the quenching element 202 and an input terminal of the waveform shaping unit 210. A voltage VH (second voltage) higher than the voltage VL supplied to the anode is supplied to the cathode of the APD 201. As a result, a reverse bias voltage that causes the APD 201 to perform the avalanche multiplication operation is supplied to the anode and the cathode of the APD 201. In the APD 201 to which the reverse bias voltage is supplied, when a charge is generated by the incident light, this charge causes avalanche multiplication, and an avalanche current is generated.

The operation modes in the case where a reverse bias voltage is supplied to the APD 201 include a Geiger mode and a linear mode. The Geiger mode is a mode in which a potential difference between the anode and the cathode is higher than a breakdown voltage, and the linear mode is a mode in which a potential difference between the anode and the cathode is near or lower than the breakdown voltage.

The APD operated in the Geiger mode is referred to as a single photon avalanche diode (SPAD). In this case, for example, the voltage VL (first voltage) is −30 V, and the voltage VH (second voltage) is 1 V. The APD 201 may operate in the linear mode or the Geiger mode. In the case of the SPAD, a potential difference becomes greater than that of the APD of the linear mode, and the effect of avalanche multiplication becomes significant, so that the SPAD is used.

The quenching element 202 functions as a load circuit (quenching circuit) when a signal is multiplied by avalanche multiplication. The quenching element 202 suppresses the voltage supplied to the APD 201 and suppresses the avalanche multiplication (quenching operation). Further, the quenching element 202 returns the voltage supplied to the APD 201 to the voltage VH by passing a current corresponding to the voltage drop due to the quenching operation (recharge operation). The quenching element 202 may be, for example, a resistive element.

The waveform shaping unit 210 shapes the potential change of the cathode of the APD 201 obtained at the time of photon detection, and outputs a pulse signal. For example, an inverter circuit is used as the waveform shaping unit 210. Although FIG. 23 illustrates an example in which one inverter is used as the waveform shaping unit 210, the waveform shaping unit 210 may be a circuit in which a plurality of inverters are connected in series, or may be another circuit having a waveform shaping effect.

The counter circuit 211 counts the pulse signals output from the waveform shaping unit 210 and holds a digital signal indicating the count value. When a control signal is supplied from the vertical scanning circuit 110 through the driving line 213, the counter circuit 211 resets the held signal.

The selection circuit 212 is supplied with a control signal from the vertical scanning circuit 110 illustrated in FIG. 22 through the driving line 214 illustrated in FIG. 23. In response to this control signal, the selection circuit 212 switches between the electrical connection and the non-connection of the counter circuit 211 and the pixel output signal line 113. The selection circuit 212 includes, for example, a buffer circuit or the like for outputting a signal corresponding to a value held in the counter circuit 211.

In the example of FIG. 23, the selection circuit 212 switches between the electrical connection and the non-connection of the counter circuit 211 and the pixel output signal line 113; however, the method of controlling the signal output to the pixel output signal line 113 is not limited thereto. For example, a switch such as a transistor may be arranged at a node such as between the quenching element 202 and the APD 201 or between the photoelectric conversion unit 102 and the pixel signal processing unit 103, and the signal output to the pixel output signal line 113 may be controlled by switching the electrical connection and the non-connection. Alternatively, the signal output to the pixel output signal line 113 may be controlled by changing the value of the voltage VH or the voltage VL supplied to the photoelectric conversion unit 102 using a switch such as a transistor.

FIG. 23 illustrates a configuration example in which the counter circuit 211 is used. However, instead of the counter circuit 211, a time-to-digital converter (hereinafter referred to as TDC) and a memory may be used to acquire the timing of detecting the pulse. In this case, the generation timing of the pulse signal output from the waveform shaping unit 210 is converted into a digital signal by the TDC. In this case, a control signal (reference signal) may be supplied from the vertical scanning circuit 110 of FIG. 22 to the TDC via the driving line. The TDC acquires, as a digital signal, a signal indicating a relative time of an input timing of a pulse based on a control signal.

FIGS. 24A, 24B, and 24C are diagrams illustrating an operation of the APD 201 according to the present embodiment. FIG. 24A is a diagram illustrating the APD 201, the quenching element 202, and the waveform shaping unit 210 in FIG. 23. As illustrated in FIG. 24A, the connection node of the APD 201, the quenching element 202, and the input terminal of the waveform shaping unit 210 is referred to as node A. Further, as illustrated in FIG. 24A, an output side of the waveform shaping unit 210 is referred to as node B.

FIG. 24B is a graph illustrating a temporal change in the potential of node A in FIG. 24A. FIG. 24C is a graph illustrating a temporal change in the potential of node B in FIG. 24A. During a period from time t0 to time t1, the voltage VH-VL is applied to the APD 201 in FIG. 24A. When a photon enters the APD 201 at the time t1, avalanche multiplication occurs in the APD 201. As a result, an avalanche current flows through the quenching element 202, and the potential of the node A drops. Thereafter, the amount of potential drop further increases, and the voltage applied to the APD 201 gradually decreases. Then, at time t2, the avalanche multiplication in the APD 201 stops. Thereby, the voltage level of node A does not drop below a certain constant value. Then, during a period from the time t2 to time t3, a current that compensates for the voltage drop flows from the node of the voltage VH to the node A, and the node A is settled to the original potential at the time t3.

In the above-described process, the potential of node B becomes the high level in a period in which the potential of node A is lower than a certain threshold value. In this way, the waveform of the drop of the potential of the node A caused by the incidence of the photon is shaped by the waveform shaping unit 210 and output as a pulse to the node B.

According to the present embodiment, a photoelectric conversion device using an avalanche photodiode, which can be applied to the data input unit 121 of the information processing device 1 according to the first to fourth embodiments, is provided. In a photoelectric conversion device using an avalanche photodiode, more abnormal pixels may occur than in a photoelectric conversion device using a conventional photodiode that does not perform avalanche multiplication. Since the information processing device 1 according to the first to fourth embodiments can suitably correct abnormal pixels, it is effective in correcting an output signal of a photoelectric conversion device using an avalanche photodiode.

Sixth Embodiment

Figure 25:
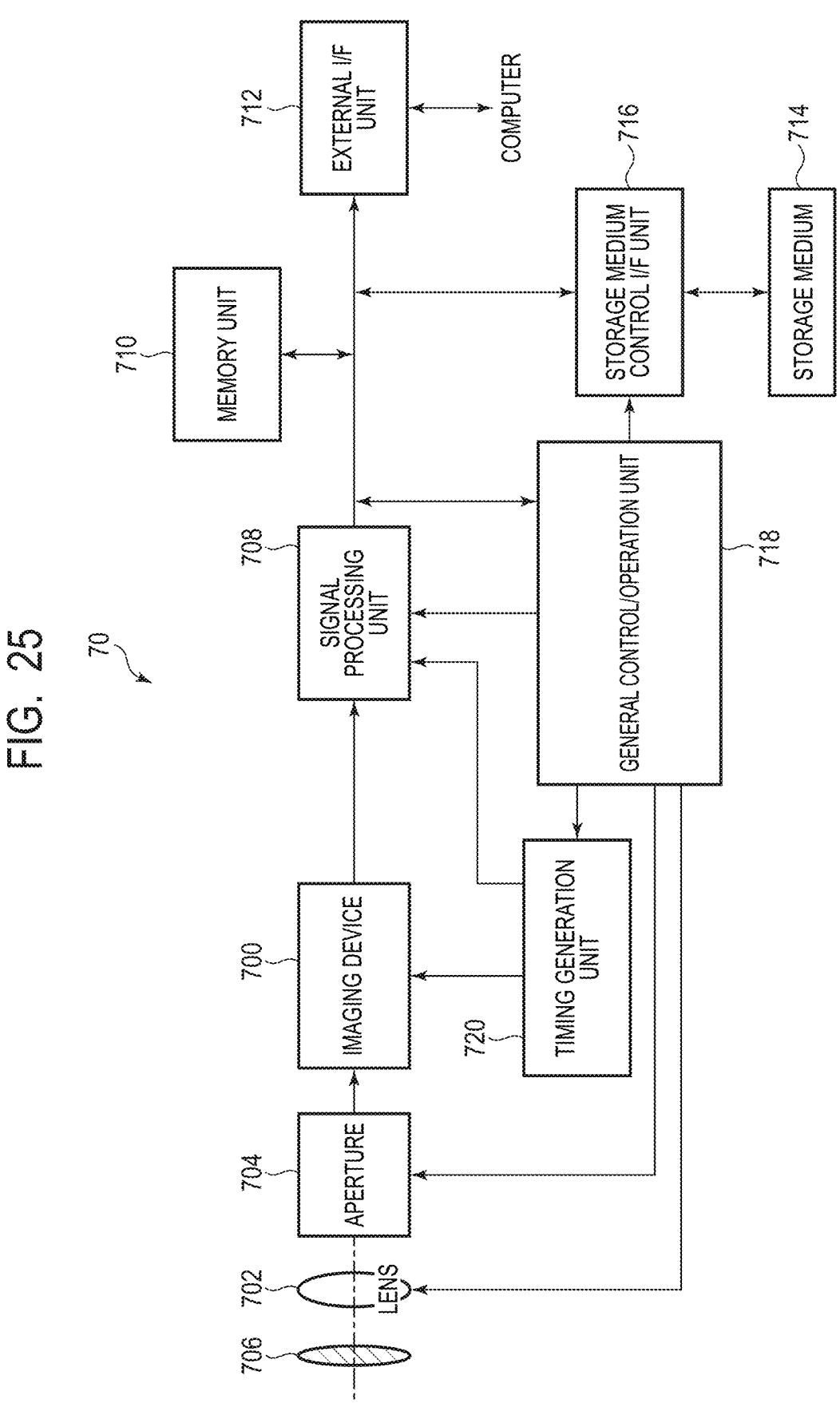
FIG. 25 is a block diagram of equipment according to a sixth embodiment.

The information processing device 1 of the above embodiments can be applied to various equipment. Examples of the equipment include a digital still camera, a digital camcorder, a camera head, a copying machine, a facsimile, a mobile phone, a vehicle-mounted camera, an observation satellite, and a surveillance camera. FIG. 25 is a block diagram of a digital still camera as an example of equipment. FIG. 25 illustrates an example in which the information processing device 1 illustrated in FIG. 1 is applied to a digital still camera.

The equipment 70 illustrated in FIG. 25 includes a barrier 706, a lens 702, an aperture 704, and an imaging device 700 (an example of the photoelectric conversion device). The equipment 70 further includes a signal processing unit (processing device) 708, a timing generation unit 720, a general control/operation unit 718 (control device), a memory unit 710 (storage device), a storage medium control I/F unit 716, a storage medium 714, and an external I/F unit 712. At least one of the barrier 706, the lens 702, and the aperture 704 is an optical device corresponding to the equipment. The barrier 706 protects the lens 702, and the lens 702 forms an optical image of an object on the imaging device 700. The aperture 704 varies the amount of light passing through the lens 702. The imaging device 700 is configured as in the above embodiments, and converts an optical image formed by the lens 702 into image data (image signal). The signal processing unit 708 performs various corrections, data compression, and the like on the image data output from the imaging device 700. The timing generation unit 720 outputs various timing signals to the imaging device 700 and the signal processing unit 708. The general control/operation unit 718 controls the entire digital still camera, and the memory unit 710 temporarily stores image data. The storage medium control I/F unit 716 is an interface for storing or reading image data on the storage medium 714, and the storage medium 714 is a detachable storage medium such as a semiconductor memory for storing or reading image data. The external I/F unit 712 is an interface for communicating with an external computer or the like. The timing signal or the like may be input from the outside of the equipment. The equipment 70 may further include a display device (a monitor, an electronic view finder, or the like) for displaying information obtained by the photoelectric conversion device. The equipment includes at least a photoelectric conversion device. Further, the equipment 70 includes at least one of an optical device, a control device, a processing device, a display device, a storage device, and a mechanical device that operates based on information obtained by the photoelectric conversion device. The mechanical device is a movable portion (for example, a robot arm) that receives a signal from the photoelectric conversion device for operation.

Each pixel may include a plurality of photoelectric conversion units (a first photoelectric conversion unit and a second photoelectric conversion unit). The signal processing unit 708 may be configured to process a pixel signal based on charges generated in the first photoelectric conversion unit and a pixel signal based on charges generated in the second photoelectric conversion unit, and acquire distance information from the imaging device 700 to an object.

Seventh Embodiment

Figure 26A:
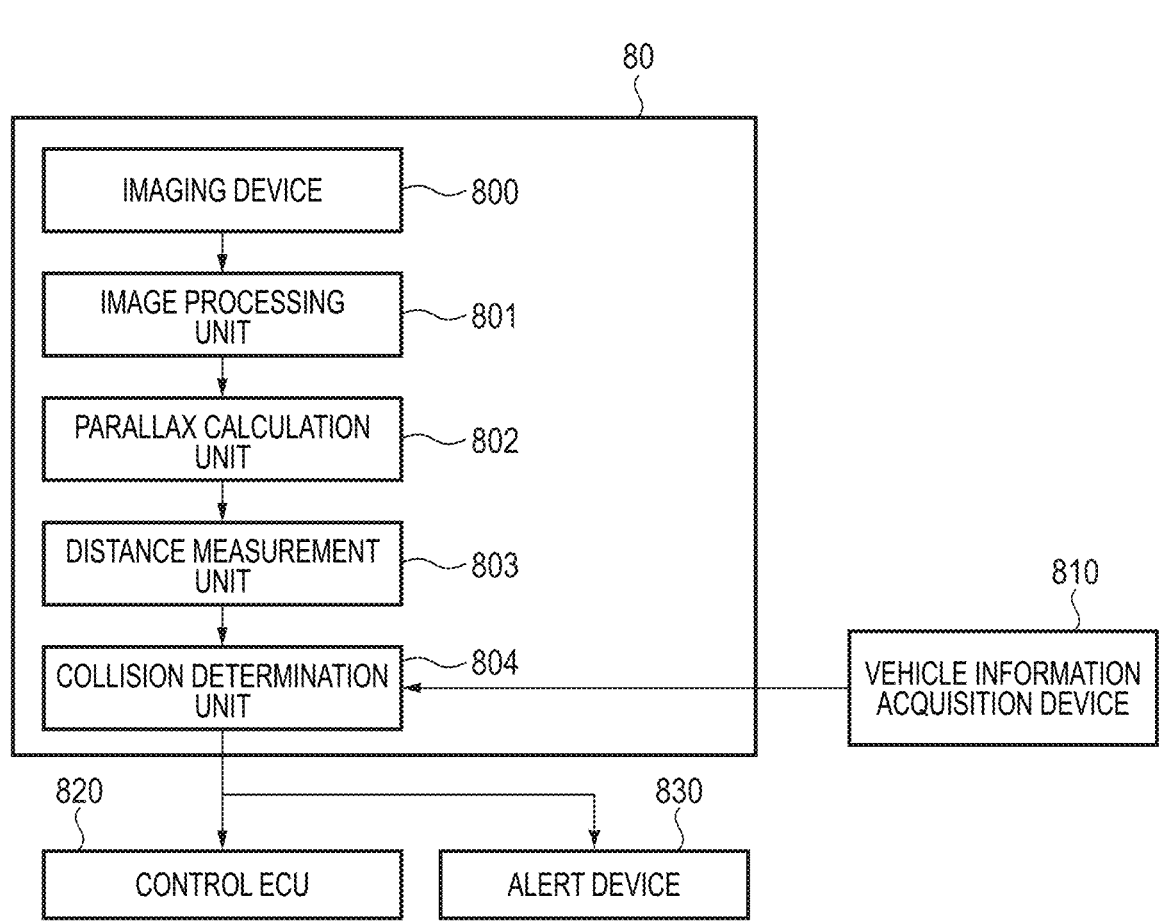
FIGS. 26A and 26B are block diagrams of equipment according to a seventh embodiment.
Figure 26B:
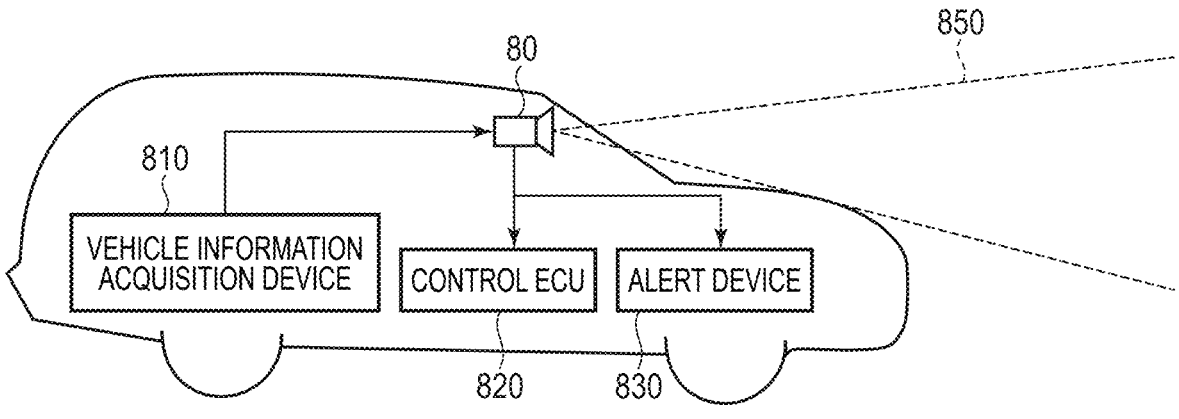

FIGS. 26A and 26B are block diagrams of equipment relating to the vehicle-mounted camera according to the present embodiment. FIGS. 26A and 26B illustrate an example in which the information processing device 1 illustrated in FIG. 1 is applied to a movable body such as a vehicle. The equipment 80 includes an imaging device 800 (an example of the photoelectric conversion device) and a signal processing device (processing device) that processes a signal from the imaging device 800. The equipment 80 includes an image processing unit 801 that performs image processing on a plurality of pieces of image data acquired by the imaging device 800, and a parallax calculation unit 802 that calculates parallax (phase difference of parallax images) from the plurality of pieces of image data acquired by the equipment 80. The equipment 80 includes a distance measurement unit 803 that calculates a distance to an object based on the calculated parallax, and a collision determination unit 804 that determines whether or not there is a possibility of collision based on the calculated distance. Here, the parallax calculation unit 802 and the distance measurement unit 803 are examples of a distance information acquisition unit that acquires distance information to the object. That is, the distance information is information on a parallax, a defocus amount, a distance to the object, and the like. The collision determination unit 804 may determine the possibility of collision using any of these pieces of distance information. The distance information acquisition unit may be realized by dedicatedly designed hardware or software modules. Further, it may be realized by a field programmable gate array (FPGA), an application specific integrated circuit (ASIC) or a combination thereof.

The equipment 80 is connected to the vehicle information acquisition device 810, and can obtain vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm such as a sound, displaying alert information on a screen of a car navigation system or the like, or giving vibration to a seat belt or a steering wheel. The equipment 80 functions as a control unit that controls the operation of controlling the vehicle as described above.

In the present embodiment, an image of the periphery of the vehicle, for example, the front or the rear is captured by the equipment 80. FIG. 26B illustrates equipment in a case where an image is captured in front of the vehicle (image capturing range 850). The vehicle information acquisition device 810 as the imaging control unit sends an instruction to the equipment 80 or the imaging device 800 to perform the imaging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

MODIFIED EMBODIMENTS

The disclosure is not limited to the above embodiments, and various modifications are possible. For example, an example in which some of the configurations of any one of the embodiments are added to other embodiments or an example in which some of the configurations of any one of the embodiments are replaced with some of the configurations of other embodiments are also embodiments of the disclosure.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A≠B) is omitted. This is because it is assumed that "A is not B" is considered when "A is B" is described.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

It should be noted that the above-described embodiments are merely specific examples for carrying out the disclosure, and the technical scope of the disclosure should not be interpreted in a limited manner by these embodiments. That is, the disclosure can be implemented in various forms without departing from the technical idea or the main features thereof.

According to the disclosure, an information processing device and an information processing method capable of more suitably correcting an abnormal pixel are provided.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-199221, filed Nov. 24, 2023, which is hereby incorporated by reference herein in its entirety.

What is claimed is:

1. A processing device comprising:
    a first connecting unit configured to determine that, when a difference between pixel values of two adjacent pixels in a plurality of pixels arranged to form a plurality of rows and a plurality of columns is within a first range, the two adjacent pixels belong to the same first connected pixel group;

a pixel value determination unit configured to determine that a first condition is satisfied when, in a neighboring pixel group including a target pixel and a neighboring pixel arranged in a vicinity of the target pixel, a rank of a pixel value of the target pixel is higher than an upper limit of a second range or lower than a lower limit of the second range;

a first connection number determination unit configured to determine that a second condition is satisfied when the number of pixels belonging to the first connected pixel group including the target pixel is equal to or less than a first threshold value; and a correction unit configured to correct the pixel value of the target pixel when at least the first condition and the second condition are satisfied and not to correct the pixel value of the target pixel when the first condition is not satisfied, or when the second condition is not satisfied; and a second connecting unit configured to determine that, in two adjacent first pixel and second pixel, when a difference between a pixel value of the first pixel and a representative value of a neighboring pixel group including a neighboring pixel arranged in a vicinity of the first pixel is outside a third range, and a difference between a pixel value of the second pixel and a representative value of a neighboring pixel group including a neighboring pixel arranged in a vicinity of the second pixel is outside a fourth range, the first pixel and the second pixel belong to the same second connected pixel group.

2. The processing device according to claim 1, wherein the upper limit of the second range is the second, and the lower limit of the second range is a rank of a number obtained by subtracting one from the number of pixels included in the neighboring pixel group.

3. The processing device according to claim 1, wherein the first threshold value is equal to or greater than two.

4. The processing device according to claim 1, wherein the neighboring pixel is arranged in the same row as or adjacent row as the target pixel and in the same column as or adjacent column as the target pixel.

5. The processing device according to claim 4, wherein the neighboring pixel group includes the target pixel and a plurality of the neighboring pixels arranged so as to surround the target pixel.

6. The processing device according to claim 1 further comprising:

a second connection number determination unit configured to determine that a third condition is satisfied when the number of pixels belonging to the second connected pixel group including the target pixel is greater than a second threshold value, wherein the correction unit corrects the pixel value of the target pixel when both the first condition and the second condition are satisfied, and the third condition is not satisfied, and wherein the correction unit does not correct the pixel value of the target pixel when the first condition is not satisfied, when the second condition is not satisfied, or when the third condition is satisfied.

7. The processing device according to claim 6, wherein the second threshold value is equal to or greater than two.

8. The processing device according to claim 6, wherein the representative value is a median value of pixel values of a plurality of pixels included in the neighboring pixel group.

9. The processing device according to claim 1 further comprising:

a second connection number determination unit configured to determine that a third condition is satisfied when the number of pixels belonging to the second connected pixel group including the target pixel is greater than a second threshold value; and a prominence determination unit configured to determine that a fourth condition is satisfied when the pixel value of the target pixel is equal to or greater than a third threshold value, or when the pixel value of the target pixel is less than a fourth threshold value, wherein the correction unit corrects the pixel value of the target pixel when both the first condition and the second condition are satisfied, and the third condition is not satisfied, wherein the correction unit corrects the pixel value of the target pixel when all the first condition, the second condition, the third condition, and the fourth condition are satisfied, and wherein the correction unit does not correct the pixel value of the target pixel when the first condition is not satisfied, when the second condition is not satisfied, or when the fourth condition is not satisfied.

10. The processing device according to claim 1, wherein the pixel value is generated based on a signal obtained by photoelectrically converting incident light by a conversion element.

11. The processing device according to claim 10, wherein the conversion element includes an avalanche photodiode.

12. A conversion device comprising:

a plurality of conversion elements arranged to form a plurality of rows and a plurality of columns; and the processing device according to claim 1 to which pixel values based on signals output from the plurality of conversion elements are input.

13. Equipment comprising:

the conversion device according to claim 12; and at least any one of:

an optical device adapted for the conversion device, a control device configured to control the conversion device, a processing device configured to process a signal output from the conversion device, a display device configured to display information obtained by the conversion device, a storage device configured to store information obtained by the conversion device, and a mechanical device configured to operate based on information obtained by the conversion device.

14. The equipment according to claim 13, wherein the processing device acquires distance information on a distance from the conversion device to an object.

15. A processing method comprising:

determining that, when a difference between pixel values of two adjacent pixels in a plurality of pixels arranged to form a plurality of rows and a plurality of columns is within a first range, the two adjacent pixels belong to the same first connected pixel group;

determining that a first condition is satisfied when, in a neighboring pixel group including a target pixel and a neighboring pixel arranged in a vicinity of the target pixel, a rank of a pixel value of the target pixel is higher than an upper limit of a second range or lower than a lower limit of the second range;

determining that a second condition is satisfied when the number of pixels belonging to the first connected pixel group including the target pixel is equal to or less than a first threshold value;

correcting the pixel value of the target pixel when at least the first condition and the second condition are satisfied; and determining that, in two adjacent first pixel and second pixel, when a difference between a pixel value of the first pixel and a representative value of a neighboring pixel group including a neighboring pixel arranged in a vicinity of the first pixel is outside a third range, and a difference between a pixel value of the second pixel and a representative value of a neighboring pixel group including a neighboring pixel arranged in a vicinity of the second pixel is outside a fourth range, the first pixel and the second pixel belong to the same second connected pixel group, wherein the pixel value of the target pixel is not corrected when the first condition is not satisfied, or when the second condition is not satisfied.

16. The method according to claim 15, further comprising:

determining that a third condition is satisfied when the number of pixels belonging to the second connected pixel group including the target pixel is greater than a second threshold value, wherein the correcting corrects the pixel value of the target pixel when both the first condition and the second condition are satisfied, and the third condition is not satisfied, and wherein the correcting does not correct the pixel value of the target pixel when the first condition is not satisfied, when the second condition is not satisfied, or when the third condition is satisfied.

17. A processing device comprising:

a first connecting unit configured to determine that, when a difference between pixel values of two adjacent pixels in a plurality of pixels arranged to form a plurality of rows and a plurality of columns is within a first range, the two adjacent pixels belong to the same first connected pixel group;

a pixel value determination unit configured to determine that a first condition is satisfied when, in a neighboring pixel group including a target pixel and a neighboring pixel arranged in a vicinity of the target pixel, a rank of a pixel value of the target pixel is higher than an upper limit of a second range or lower than a lower limit of the second range;

a first connection number determination unit configured to determine that a second condition is satisfied when the number of pixels belonging to the first connected pixel group including the target pixel is equal to or less than a first threshold value;

a correction unit configured to correct the pixel value of the target pixel when at least the first condition and the second condition are satisfied and not to correct the pixel value of the target pixel when the first condition is not satisfied, or when the second condition is not satisfied; and a density determination unit configured to determine that a fifth condition is satisfied when, in a plurality of pixels within a predetermined range including the target pixel, the number of pixels in which a difference between a pixel value of a certain pixel and a representative value of a neighboring pixel group including a neighboring pixel arranged in a vicinity of the certain pixel is outside a fifth range is greater than a fifth threshold value.

18. The processing device according to claim 17 wherein the correction unit corrects the pixel value of the target pixel when both the first condition and the second condition are satisfied, and the fifth condition is not satisfied, and wherein the correction unit does not correct the pixel value of the target pixel when the first condition is not satisfied, when the second condition is not satisfied, or when the fifth condition is satisfied.

19. The processing device according to claim 18, wherein the fifth threshold value is equal to or greater than two.

* * * * *